United States Patent
Belleschi et al.

(10) Patent No.: US 12,238,747 B2
(45) Date of Patent: Feb. 25, 2025

(54) SIDELINK RESOURCE ALLOCATION FOR ENHANCED MOBILITY

(71) Applicant: Telefonaktiebolaget LM Ericsson (PUBL), Stockholm (SE)

(72) Inventors: Marco Belleschi, Solna (SE); Massimo Condoluci, Solna (SE); Shehzad Ali Ashraf, Aachen (DE); Ricardo Blasco Serrano, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 648 days.

(21) Appl. No.: 17/278,707

(22) PCT Filed: Sep. 20, 2019

(86) PCT No.: PCT/EP2019/075283
§ 371 (c)(1),
(2) Date: Mar. 23, 2021

(87) PCT Pub. No.: WO2020/064527
PCT Pub. Date: Apr. 2, 2020

(65) Prior Publication Data
US 2022/0039082 A1    Feb. 3, 2022

Related U.S. Application Data

(60) Provisional application No. 62/737,575, filed on Sep. 27, 2018.

(51) Int. Cl.
*H04W 72/04* (2023.01)
*H04W 4/40* (2018.01)
(Continued)

(52) U.S. Cl.
CPC ............ *H04W 72/51* (2023.01); *H04W 4/40* (2018.02); *H04W 72/02* (2013.01); *H04W 76/36* (2018.02); *H04W 92/18* (2013.01)

(58) Field of Classification Search
CPC ....... H04W 4/021; H04W 4/025; H04W 4/40; H04W 72/00; H04W 72/02; H04W 76/36; H04W 92/18; H04W 72/51
(Continued)

(56) References Cited

U.S. PATENT DOCUMENTS

2017/0289767 A1    10/2017  Yu et al.
2017/0325214 A1*   11/2017  Lu ........................... H04W 4/70
(Continued)

FOREIGN PATENT DOCUMENTS

WO    WO2014081354 A1    5/2014
WO       2017 171321 A1   10/2017

OTHER PUBLICATIONS

PCT Notification of Transmittal of the International Search Report and the Written Opinion of the International Searching Authority, or the Declaration issued for International application No. PCT/EP2019/075283—Dec. 5, 2019.
(Continued)

*Primary Examiner* — Robert J Lopata
(74) *Attorney, Agent, or Firm* — Baker Botts L.L.P.

(57) ABSTRACT

A method by a wireless device (110) includes sending, to a network node (160) having an associated coverage area, a request for a sidelink (SL) resource pool configuration for a V2X application associated with the wireless device (110). The request includes one or more geographical area identifiers associated with one or more respective SL resource pool configurations. The method further includes receiving, in response to the request, a SL resource pool configuration from the network node (160).

18 Claims, 15 Drawing Sheets

(51) Int. Cl.
  *H04W 72/02* (2009.01)
  *H04W 72/51* (2023.01)
  *H04W 76/36* (2018.01)
  *H04W 92/18* (2009.01)

(58) Field of Classification Search
  USPC .......................................................... 370/329
  See application file for complete search history.

(56) References Cited

U.S. PATENT DOCUMENTS

| | | | |
|---|---|---|---|
| 2020/0008266 A1* | 1/2020 | Pan | H04L 1/1642 |
| 2020/0053553 A1* | 2/2020 | Adachi | H04W 4/40 |
| 2020/0077380 A1* | 3/2020 | Hahn | H04W 8/02 |
| 2020/0196279 A1* | 6/2020 | Thomas | H04W 72/04 |
| 2020/0305152 A1* | 9/2020 | Yasukawa | H04W 92/18 |
| 2021/0219268 A1* | 7/2021 | Li | H04W 72/20 |
| 2021/0243762 A1* | 8/2021 | Selvanesan | H04W 72/53 |

OTHER PUBLICATIONS

3GPP TSG-RAN WG2 Meeting #97; Athens, Greece; Change Request; Title: Correction on exceptional pool's resource selection; Source to WG: Nokia, Alcatel-Lucent Shanghai Bell; Source to TSG: R2 (R2-1702069)—Feb. 13-17, 2017.

* cited by examiner

SIDELINK RESOURCE ALLOCATION FOR ENHANCED MOBILITY

PRIORITY

This nonprovisional application is a U.S. National Stage Filing under 35 U.S.C. § 371 of International Patent Application Serial No. PCT/EP2019/075283 filed Sep. 20, 2019 and entitled "SIDELINK RESOURCE ALLOCATION FOR ENHANCED MOBILITY" which claims priority to U.S. Provisional Patent Application No. 62/737,575 filed Sep. 27, 2018 both of which are hereby incorporated by reference in their entirety.

BACKGROUND

During Release 12, the Long Term Evolution (LTE) standard has been extended with support of device to device (D2D) (specified as "sidelink" (SL)) features targeting both commercial and Public Safety applications. Some applications enabled by Release 12 LTE are device discovery, where devices are able to sense the proximity of another device and associated application by broadcasting and detecting discovery messages that carry device and application identities. Another application consists of direct communication based on physical channels terminated directly between devices. In 3GPP, all of these applications are defined under the umbrella of Proximity Services (ProSe).

One of the potential extensions of the ProSe framework consists of support of vehicle-to-everything (V2X) communication, which includes any combination of direct communication between vehicles, pedestrians, and infrastructure. V2X communication may take advantage of a network (NW) infrastructure, when available, but at least basic V2X connectivity should be possible even in case of lack of coverage. Providing an LTE-based V2X interface may be economically advantageous because of the LTE economies of scale and it may enable tighter integration between communications with the NW infrastructure, pedestrians, and vehicle communications, as compared to using a dedicated V2X technology.

There are many research projects and field tests of connected vehicles in various countries or regions, including projects that are based on the use of existing cellular infrastructure.

V2X communications may carry both non-safety and safety information, where each of the applications and services may be associated with specific requirements sets (e.g., in terms of latency, reliability, capacity, etc.).

FIG. 1 illustrates some example types of V2X communications. As shown in FIG. 1, from the application point of view, V2X includes the following types of communication/services:

Vehicle to vehicle (V2V): V2V communication/services covers communication between vehicles using V2V applications and is predominantly broadcast-based. V2V may be realized by either direct communication between the devices in the respective vehicles, or via infrastructure such as a cellular network. An example of V2V is the transmission of a cooperative awareness message (CAM) with vehicle status information (such as position, direction, and speed) transmitted repeatedly to other vehicles in the proximity (every 100 ms-1 s). Another example is the transmission of a decentralized environmental notification message (DENM), which is an event-triggered message to alert vehicles. These two examples are taken from the European Telecommunications Standards Institute (ETSI) Intelligent Transport Systems (ITS) specification of V2X applications, which also specifies the conditions under which the messages are generated. A main characteristic of V2V applications is the tight requirements on latency that can vary from 20 ms (for pre-crash warning messages) to 100 ms for other road safety services.

Vehicle to infrastructure (V2I): V2I comprises communication between vehicles and a Roadside Unit (RSU). The RSU is a stationary transportation infrastructure entity which communicates with vehicles in its proximity. An example of V2I is transmission of speed notifications from the RSU to vehicles, as well as queue information, collision risk alerts, and curve speed warnings. Due to the safety-related nature of V2I, delay requirements are similar to V2V requirements.

Vehicle to pedestrian (V2P): V2P covers communication between vehicles and vulnerable road users, such as pedestrians, using V2P applications. V2P typically takes place between distinct vehicles and pedestrians either directly or via infrastructure such as cellular network.

Vehicle to network (V2N): V2N covers communication between a vehicle and a centralized application server (or an ITS Traffic Management Center) both using V2N applications, via infrastructure (such as a cellular network). One example is a bad road condition warning sent to all vehicles in a wide area, or traffic flow optimization in which a V2N application suggests speeds to vehicles and coordinates traffic lights. Therefore, V2N messages are supposed to be controlled by a centralized entity (i.e., the Traffic Management Center) and provisioned to vehicles in a large geographical area, rather than in a small area. Additionally, unlike V2V/V2I, latency requirements are more relaxed in V2N because it is not meant to be used for non-safety purposes (e.g., 1 s latency requirement is typically considered).

As previously mentioned, SL transmissions (also known as D2D or ProSe) over the so-called PC5 interface in cellular spectrum have been standardized in 3GPP since Release 12. In 3GPP Release 12, two different transmission modes have been specified in 3GPP. In one mode (mode-1), a user equipment (UE) in RRC_CONNECTED mode requests D2D resources and the eNB grants them via PDCCH (DCI5) or via dedicated signalling. In another mode (mode-2), a UE autonomously selects resources for transmission from a pool of available resources that the eNB provides in broadcast via system information block (SIB) signalling for transmissions on carriers other than the Primary Cell (PCell) or via dedicated signaling for transmission on the PCell. Therefore, unlike the first operation mode, the second operation mode can be performed also by UEs in RRC_IDLE and in some cases even by UEs out of coverage.

In Release 14, the usage of SL is extended to the V2X domain. The original design of the SL physical layer in Release 12 targeted a scenario with a small number of UEs competing for the same physical resources in the spectrum to carry voice packets for mission-critical push-to-talk (MCPTT) traffic and assumed low UE mobility. On the other hand, in V2X the SL should be able to cope with a higher load scenario (i.e., hundreds of cars potentially contending for physical resources), to carry time and/or event-triggered V2X messages (e.g., CAM, DENM), and with high UE mobility. For such reasons, 3GPP has discussed possible enhancements to the SL physical layer.

A first enhancement that has been specified in Release 14 is the introduction of a new transmission mode (i.e., mode-3), which resembles mode-1 in the sense that it is the eNB that explicitly assigns SL resources to the UE. However, unlike mode-1, the eNB has the possibility to configure the SL resources semi-persistently in a semi persistent scheduling (SPS)-like fashion (i.e., the eNB assigns a SL grant for periodic transmissions on a certain frequency resource).

A second enhancement is the introduction of the so-called channel sensing and sensing-aware UE autonomous resource allocation, which corresponds to mode-4 transmission mode. Unlike random resource selection, which is the base for Release 12 and Release 13 ProSe communications, in V2V (Release 14) UEs are expected to continuously sense the channel and search for resources in the different part of the spectrum that are less interfered. Such sensing has the objective to limit collisions between UEs. This second enhancement also introduced a resource reservation procedure which allows a UE to reserve a certain number of transmitting resources for SL transmission on different Time Transmission Intervals (TTIs). In particular, at the beginning of the resource selection procedure, a transmitting counter is initialized. Such counter is stepped whenever a SL transmission is performed. When the counter reaches 0, the UE performs a new resource reselection procedure. Resource reselection can also be performed if certain events occur, such as, for example, if an urgent packet needs to be transmitted and the previously reserved resources do not allow to fulfill the latency requirement of the packet, or if certain number of reserved resources are left unused.

More recently, in Release 15, 3GPP has introduced a new set of enhancements to address advanced V2X use cases such as autonomous driving, remote driving, data/sensor sharing, etc. For these advanced applications, the expected requirements to meet the needed data rate, reliability, latency, communication range and speed are made more stringent. To support at least some of these advanced V2X services in LTE, a new set of features has been standardized (e.g., carrier aggregation (CA) (up to 8 PC5 carriers) and high order modulation (i.e., 64 QAM)).

To perform SL communications on certain V2X frequency, the UE needs to be configured with SIB/Radio Resource Control (RRC) signaling which conveys the Transmit (TX)/Receive (RX) pool and all the necessary transmitting parameter(s). If the UE is out-of-coverage, it is not capable of receiving the SIB/RRC signaling, and it instead uses preconfigured resources that are provisioned by higher layers or stored in the SIM/UICC of the UE.

That means that whenever a UE does cell (re)selection or handover, it needs to acquire a new SIB/RRC configuration from the new cell. While doing handover, the UE can be configured with an exceptional pool to be used for the whole duration of the handover, so as to minimize V2X service interruption. Similarly, before going out-of-coverage (i.e., when the UE starts detecting out-of-sync indicators at physical layer), or when the UE is performing connection (re) establishment, the UE can use the exceptional resources to limit V2X service interruption.

There currently exist certain challenge(s), however. For example, an important aspect to consider regarding V2X scenarios is related to the mobility of UEs. In this case, guaranteeing as stable performance as possible represents an important feature to be fulfilled for the stability of certain V2X applications. For instance, considering platooning, it is important that performances are stable while the platoon moves, as drastic changes of performance might involve instabilities such as too quick adaptation of inter-truck distances with possible safety impacts, and increased fuel consumption. Having a stable resource allocation within a certain geographical area and across several cells is certainly beneficial to achieving stable performances that will be less affected by mobility procedures such as handover or cell (re)selection.

However, in current SL systems, the TX resources and transmitting parameters provided by neighboring cells might be different, and there is no coordination between neighboring cells to take into account the desired Quality of Service (QoS) of a moving UE or group of UEs. This might imply that at every handover and/or cell (re)selection the SL performances in the target cell might be significantly different than the performances achieved in the source cell. For example, for the case of the platoon, that would imply that the inter-truck distances should be adjusted with possible impacts on safety and additional fuel consumption.

Additionally, the need to acquire SIB/RRC signaling at every cell (re)selection and/or handover also has latency implications in the acquiring of a new resource pool configuration to perform SL communication.

Furthermore, providing SIB/RRC signaling separately by each cell has the drawback of signaling overhead in the Uu interface.

SUMMARY

Certain aspects of the present disclosure and their embodiments may provide solutions to these or other challenges. The various embodiments described herein enable a user equipment (UE) or a group of UEs when in coverage of a mobile network to request and exploit a resource pool for sidelink (SL) transmission that is common in a certain area ranging multiple cells. In certain embodiments, one or more UEs associated to the same application, once connected to a mobile network, receive from the Radio Access Network (RAN) upon request an SL resource pool configuration for SL communications when they are in coverage scenarios. This configuration can also be used when under the coverage of a different cell, unless differently indicated by the RAN.

According to certain embodiments, a method by a wireless device includes sending, to a network node having an associated coverage area, a request for a SL resource pool configuration for a V2X application associated with the wireless device. The request includes one or more geographical area identifiers associated with one or more respective SL resource pool configurations. The method further includes receiving, in response to the request, a SL resource pool configuration from the network node.

According to certain embodiments, a wireless device includes processing circuitry configured to send, to a network node having an associated coverage area, a request for a SL resource pool configuration for a V2X application associated with the wireless device. The request includes one or more geographical area identifiers associated with one or more respective SL resource pool configurations. The processing circuitry is further configured to receive, in response to the request, a SL resource pool configuration from the network node.

According to certain embodiments, a method by a network node includes receiving, from a wireless device, a request for a SL resource pool configuration for a V2X application associated with the wireless device. The request includes one or more geographical area identifiers associated with one or more respective SL resource pool configurations. The network node generates a SL resource pool configuration for the V2X application associated with the wireless device and sends the generated SL resource pool configuration to the wireless device.

According to certain embodiments, a network node includes processing circuitry configured to receive, from a wireless device, a request for a SL resource pool configuration for a V2X application associated with the wireless device. The request includes one or more geographical area identifiers associated with one or more respective SL resource pool configurations. The processing circuitry is further configured to generate a SL resource pool configuration for the V2X application associated with the wireless device and send the generated SL resource pool configuration to the wireless device.

Certain embodiments may provide one or more of the following technical advantage(s). As one example, certain embodiments may advantageously improve the Quality of Service (QoS) experience by UEs associated to the application, as UEs can request a SL resource pool configuration for in coverage scenarios that spans across multiple cells. This improves the capability of supporting a stable quality for the UEs when moving from one cell to another. As another example, certain embodiments may advantageously enable the network to define and update ad-hoc configuration for in-coverage scenarios, thereby improving the spectral efficiency and the utilization of radio resources. This is translated into further benefits in terms of quality experienced by the UEs. In addition, when defining SL resource pool configuration that can be suitable for multiple cells, SIB/RRC signaling is reduced as the configuration does not need to be retrieved by UEs all the times they change eNB, unless an update of the configuration is needed.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
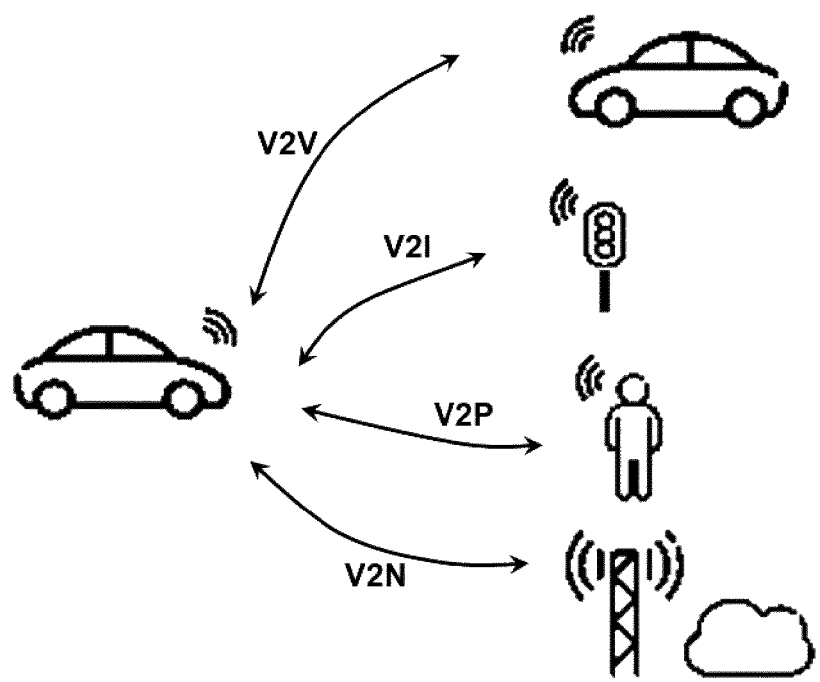
FIG. 1 illustrates some example types of V2X communications.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The following description assumes that one UE needs to exchange data with one or multiple UEs involved in the same application service (or task). One example of an application concerning vehicular scenarios is platooning, where multiple vehicles are grouped together and share the same traffic behavior (e.g., trajectory, speed, and/or intra-platoon distance) by exchanging information among each other. A network provides a communication infrastructure for the SL (ad-hoc) communication among involved UEs, including RAN (i.e., eNB or gNB) and Core Network (CN) (e.g., Policy Control Function (PCF), Access Mobility Function (AMF), Session Management Function (SMF)). When in the coverage area of a mobile network, UEs are able to connect to the network to exchange control and data traffic with the mobile network through the RAN (i.e., eNB or gNB).

Although the following uses the case of vehicular communications as an example, the various embodiments described herein can be applicable to any type of group service or task (e.g., UEs interested in the same type of services/tasks, or UEs moving together within a bus/train/truck/car, etc.). In addition, note that the notion of group may be known by lower layer nodes (i.e., RAN nodes) or by CN nodes (e.g., SMF, PCF or AMF) or unknown by the network, in which case only the V2X application server is aware of that.

UEs need to have a SL resource pool configuration in order to transmit/receive over SL. In the following, an SL resource pool configuration refers to information needed to perform SL communications. The information in the SL resource pool configuration may include, for example, information such as the time and frequency resources that can be used to perform SL transmission/reception, the set of transmitting parameters which may depend on the specific QoS of the service to be transmitted and channel congestion/interference experienced, the synchronization sources the UE should follow before using the concerned resources, as well as any other suitable information.

In the present disclosure, it is assumed that UEs are able to switch to CONNECTED mode when in coverage of a mobile network (i.e., they perform all the procedures necessary to exchange control and data traffic with the mobile network, including control information such as specific mobile network configuration signaled by the RAN). Certain embodiments described herein relate to when UEs switch from out of coverage to in coverage case. Additionally, certain embodiments relate to when UEs move from the coverage area of one cell to the coverage area of another cell.

Assume that UEs involved in an application (e.g., platooning) are moving from an out of coverage area to an area with mobile coverage. Currently, UEs are exploiting a SL resource pool configuration for out of coverage scenarios (pre-configuration). When in coverage of the mobile network, the UEs switch to CONNECTED mode.

According to a first example embodiment, one of the UEs that is involved in the application, after performing the connection to the relevant eNB for the coverage area where it is currently located, sends a request to the eNB to acquire a SL resource pool configuration for in coverage scenarios valid in a geographical area potentially spanning multiple cells to be used by all the UEs involved in the application. The geographical area in which a certain SL resource pool configuration may be applicable can be different for different V2X services, and different QoS requirements. In some cases, the configuration also takes into account the route information of the UEs involved in the particular application. For instance, in certain embodiments, a UE moving in north direction belong to same geographical area and use a different configuration (provided by the eNB) as compared to a UE moving in the opposite direction (i.e., south), although the geographical area and application type for both the UEs are same. One practical scenario for such a configuration is two platoons moving in the opposite direction and camping on the same cell. In some other cases, the validity of the configuration may also be time dependent. In other words, if a UE, after acquiring the configuration by eNB, goes out of coverage, it is still able to use the configuration for a certain configured time. Furthermore, in some cases, the validity time of the configuration may also depend on the speed of the UE belonging to the application.

In certain embodiments, a geographical area may be defined by the operator, for example through Operations Support System (OSS)/Business Support Systems (BSS), and it may be defined by a set of geographical coordinates delimiting the geographical area, spanning one or more cell, or it may be defined by a set of cells. The geographical area configuration can be such that the same cell is part of one or more geographical areas.

The request from the UE may be sent at a variety of times. As one example, the request may be sent by a UE to the eNB via RRC signaling upon entering connection establishment. As another example, the request may be sent by a UE to the eNB as part of the random-access procedure (e.g., as part of the msg3 envelope).

In certain embodiments, a geographical area ID validity may be provided by higher layers and be associated to a certain geographical area that can cover one or multiple cells. In some cases, the UE may retrieve the geographical area ID of the geographical area in which it is located from the measured geographical coordinates. In certain embodiments, each cell may indicate (e.g., as part of the SIB signaling) the geographical area ID to which a cell is located or the one or more geographical area IDs for which the cell can provide SL resource allocation. In its request, the UE may indicate a variety of information. For example, the UE may indicate one or more of the following:

- The geographical area IDs of the resource pool configuration it would like to receive. In certain embodiments, each different geographical area ID may be associated to a different resource pool configuration. In certain embodiments, if the same cell is part of more than one geographical areas, the gNB may provide different resource pool configurations for the concerned geographical areas.
- The expected or planned route of the UE. In certain embodiments, this information may include the moving direction of the UE for which resource pool configuration it would like to receive.
- The speed of the UE, which may determine the validity time of the resource pool configuration, it will receive.
- The System Information Radio Network Temporary Identifier (SI-RNTI) of the SIB containing the relevant SL V2X configuration that the UE is interested in.
- The IDs of the V2X services it transmits (i.e., which are currently buffered in the SL buffer) or it intends to transmit, or it is capable to transmit. In certain embodiments, the V2X service ID may be represented in the form of Private System ID (PSID), Application Identifier (AID), V2X destination address, or another suitable form.
- The QoS requirements (such as Guaranteed Flow Bit Rate (GFBR), Packet Delay Budget (PDB), Packet Error Rate (PER)) of the V2X services it transmits (i.e., which are currently buffered in the SL buffer) or it intends to transmit, or it is capable to transmit
- The type of communication it is currently involved in, and for which it would like to receive SL resource configuration. In certain embodiments, the type of communication can be one or more of unicast, broadcast, and groupcast. In certain embodiments, the UE may also include the link layer ID for the type of communication, such as unicast link layer ID, or group ID.
- The time duration of each V2X service as defined above that are included in the request. In certain embodiments, the time duration may, for example, indicate for how long the UE would like to keep above reported QoS requirements, or for how long the V2X service is estimated to last.
- UE capabilities (e.g., in terms of multi-antenna transmissions, and maximum supported Modulation Coding Scheme (MCS)).

Whether the UE intends to be configured with a resource pool configuration in which the resources are autonomously selected by the UE (e.g., mode-4), or with resources explicitly scheduled by the network node (e.g., gNB) (e.g., mode-3). In case of mode-4, the UE may also indicate whether it needs dedicated resource pool configuration (i.e., not shared with other UEs or group of UEs).

For the case of group communication, the number of UEs involved in the group.

The need to release previously configured resources.

In certain embodiments, a UE may send the above request to a cell B, if any one or more (i.e., a combination) of the below events occurs:

The UE enters the coverage of a cell B (i.e., it performs handover towards a cell B while in CONNECTED mode, or it (re)select the cell B while being in IDLE mode), and the source cell is cell A, wherein cell B and cell A belong to two different geographical area. In certain embodiments, the UE may detects the geographical area ID of cell B and cell A by reading corresponding SIB.

The UE is currently configured with a resource pool configuration which is not valid in the geographical area in which the UE is currently located.

The UE is configured with a resource pool which no longer guarantees the QoS requirements of the V2X service the UE is transmitting.

The UE is configured with a resource pool which can be used for a limited amount of time, and such time has expired.

The UE was out-of-coverage and (pre)configured with a resource pool which can be used only when the UE is out-of-coverage with respect to the SL V2X frequency, and the UE enters the coverage of cell B which can provide resource configuration for the SL V2X frequency.

The UE exits the geographical area covered by cell B. In this case the UE may signal to the cell B that it can release the resources previously allocated to this UE.

In certain embodiments, a UE may fall back to pre-configuration if any combination of the below events occurs:

The UE was out-of-coverage and the validity time of the received configuration by eNB expires.

The UE was out-of-coverage and goes outside the geographical zone of the received configuration.

The UE changes the direction/route and the configuration is not valid for it anymore.

The UE has not received any configuration from the eNB.

In certain embodiments, for the case of group communication, the above rules may apply only if there is at least one UE for which any of the above event(s) occur, or only if there is a specific UE for which any of the above event(s) occur, or only if at least one of the above events occurs to all UEs in the group.

In certain embodiments, the received SL resource pool configuration for in coverage scenarios can be then re-used when the UEs are under coverage of other eNBs or can be updated by another eNB if needed.

Figure 2:
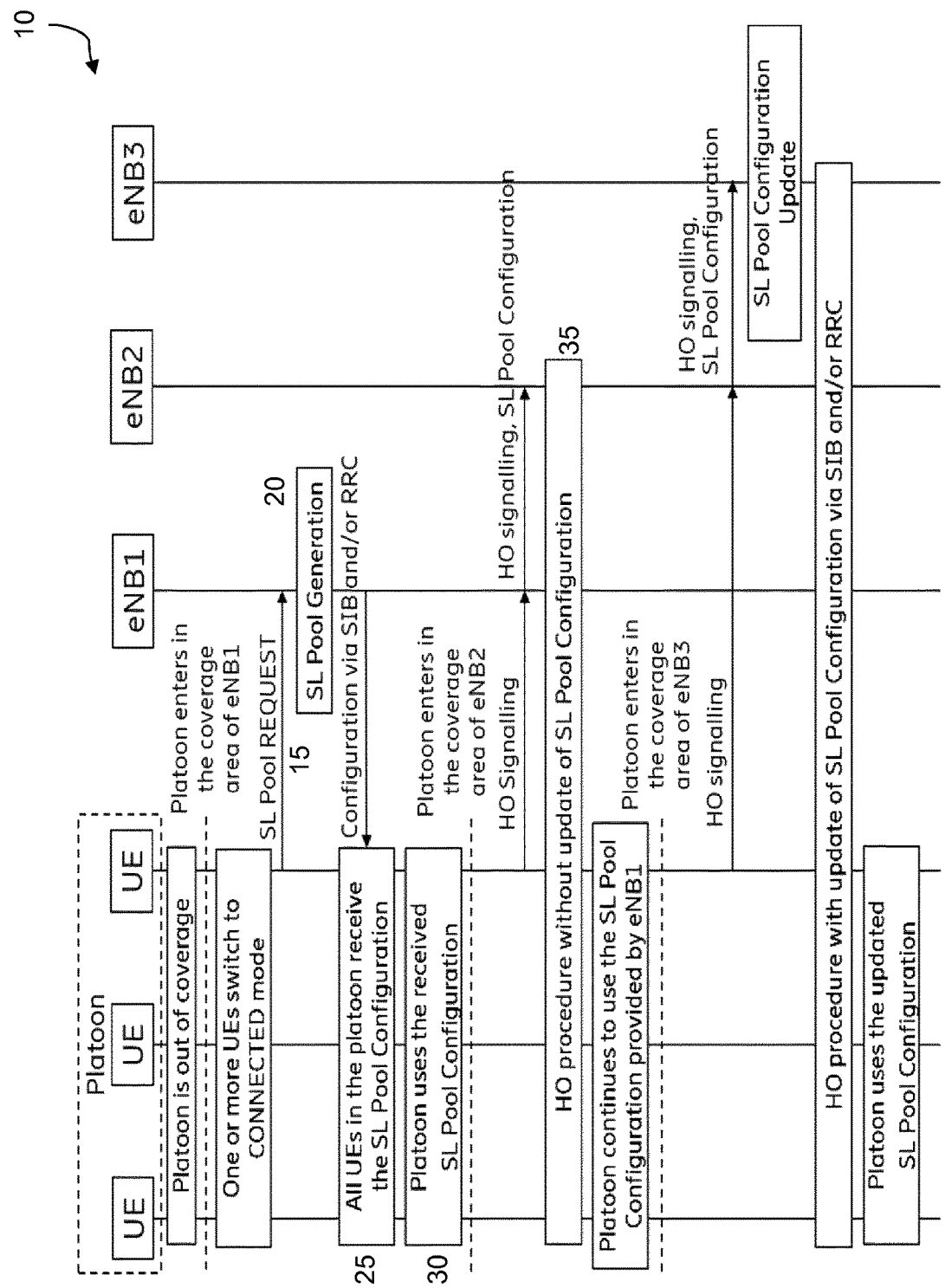
FIG. 2 illustrates a flow diagram, in accordance with certain embodiments.

FIG. 2 is a flow diagram 10, in accordance with certain embodiments. The steps of FIG. 2 are described as follows. At step 15, one of the UEs associated to the application of relevance, once in the coverage area and CONNECTED to a certain eNB providing mobile connectivity to the area where the UE is currently located and for certain direction/route, sends a request to the eNB to acquire a SL resource pool configuration to be used for in coverage scenarios.

Given that multiple UEs could be associated to the same application, different solutions can be adopted to select the UE or the UEs in charge of sending such request.

A first option (applicable for instance for applications such as platooning with a centralized platoon management) is that the application can appoint one vehicle as platoon leader and thus the UE associated to the platoon leader is in charge of sending the request once connected.

According to a second option (applicable for instance to applications such as platooning with distributed platoon management), the vehicles elect in a distributed manner a vehicle in charge of sending the request.

A third option is that, among all UEs, the first UE to enter the coverage area is in charge of sending the request.

A fourth option is that multiple UEs (potentially all UEs associated to the same application) send the request. In this case, one possible realization is that each UE can attach to the request some sort of application or group ID, to allow the RAN to understand that all UEs are associated to the same application. Another possible realization is that, when elaborating the requests from the different UEs, the RAN exploits some available information coming, for example, from the CN to understand that all UEs are associated to the same application.

According to a fifth option, it is only the UE(s) for which the local channel measurements (e.g., SL interference and/or SL congestion) are above a certain threshold associated to the QoS requirement of the SL traffic the UE is performing. In certain embodiments, one or more different thresholds may be configured for different QoS requirements and different V2X traffic types.

At step 20, the eNB elaborates the received request and generates the SL resource pool configuration to be used for in coverage scenarios (for the particular geographical zone and route/direction). In certain embodiments, the configuration may also include the validity time of the configuration that can be used for out-of-coverage. In certain embodiments, the eNB may consider one or more of the following aspects for the generation of the SL resource pool configuration for in coverage scenarios.

In certain embodiments, the configuration can be generated considering several current or expected radio aspects, including, for example, cell load, congestion, interference, and/or any other suitable current or expected radio aspects. For example, the network may take into account the concerned V2X service(s), QoS requirements signaled in the UE request for the concerned V2X traffic(s), and/or the type of communication (e.g., unicast, multicast, broadcast). In certain embodiments, the configuration may also consider resource availability in the cells belonging to the same geographical area ID, in which case the resources that will be configured for a given UE or group of UEs are known to all cells in the geographical area, (i.e., the configured resource pool is associated to a unique UE, or unicast, or groupcast identifier).

In certain embodiments, the configuration can be generated by exploiting some information received by the RAN from the CN. In some cases, the information can be in the form of one or more of subscription information of the UEs involved in the application, a pre-configuration to be used, information related to the service associated to the application including limitations or priorities, and network-specific policies. For example, before providing unicast/multicast/broadcast configuration, the eNB may check whether the UE is authorized to perform the concerned casting scheme for the signaled V2X traffic type. In certain embodiments, the authorization/subscription information may be provided to the eNB as part of the UE context configuration/setup at connection establishment.

In certain embodiments, the configuration can be generated considering one or more of: the validity of the geographic area of the provisioned configuration, the time validity of the provisioned configuration, and the route/direction validity of the provisioned configuration. In certain embodiments, the eNB may also provide multiple resource configurations, each having a different geographical area validity and time duration and direction/route information.

In certain embodiments, the configuration can be associated to a geographical area spanning multiple cells. In this case, the eNB in charge of generating the configuration may exchange information with the cells in the geographical area of relevance of the configuration in order to derive a configuration suitable for all cells in the geographical area. The information exchange can include the points listed above as well as desired configuration generated by the other cells and/or additional cell-specific parameters to be considered when generating the configuration. For example, when one or more UEs that are already configured with a resource pool perform handover, the source eNB may indicate to the target eNB as part of the handover request the resource pool configuration provided in the source cell. In another example, this coordination is not needed at RAN level, and it is performed by the operator (e.g., through OSS/BSS), which configures all the cells belonging to a certain geographical area to use a certain resource configuration for a concerned UE or for a concerned V2X service, such that such resource configuration is common to such cells.

At step 25, the SL resource pool configuration for in coverage scenarios is acquired by the UEs involved in the application. Different solutions can be adopted in this step, as described in more detail below.

In certain embodiments, all UEs associated to the application may be able to receive the configuration directly from the eNB.

In certain embodiments, the eNB may provide the configuration only to the UE (or UEs) which originated the request in the first step described above. Then, the configuration may be exchanged among all UEs by using SL communications.

In the points above, the configuration may be transmitted by the eNB by exploiting SIB or RRC or a combination of SIB and RRC signaling.

In the points above, the eNB may exploit a group ID to identify the group of UEs associated to the same application and that are going to share the same configuration. In certain embodiments, this group ID can be generated at the RAN. In certain embodiments, this group ID can be provided by one or more UEs. In certain embodiments, this group ID can be provided by the CN. In some cases, this group ID can be exploited to identify the specific SL resource pool configuration used by the UEs associated to the application.

At step 30, once the SL resource pool configuration is available at all UEs involved in the application, the UEs starts using such configuration for SL communications.

In certain embodiments, the UE(s) that received the above configuration(s) goes in IDLE mode. In certain embodiments, the UE(s) that received the above configuration(s) stay in CONNECTED mode. For example, the network may configure a UE to go in IDLE mode once it has acquired the resource pool configuration. The UE can keep using those resources unless any one or more of the events mentioned above occur, in which case the UE shall go into CONNECTED mode. In this example, it may be assumed that all the cells belonging to the concerned geographical area reserve the configured resources and are kept until the UE exits the geographical area or the validity time of the configuration expired, in which case the UE may enter CONNECTED mode to indicate to the network to release the resources. In another example, the UE shall stay in connected mode.

In certain embodiments, the UE(s) that received the above configuration(s) goes out-of-coverage. In such case, the UE may keep on using the reserved configuration until it exits the geographical area or validity time of configuration expires or it changes its direction/route.

In certain embodiments, the UE(s) may be in IDLE mode or out-of-coverage and receive the above configuration from another UE relaying such configuration.

At step 35, when UEs move to the coverage area of another eNB (i.e., the UEs are currently under the coverage of the source eNB and are moving towards the coverage of a target eNB), one or more UEs have to connect to the new eNB by performing the handover procedure. The following aspects may be considered in this case.

During this procedure, the target eNB needs to retrieve the SL resource pool configuration currently used by the UEs for in coverage scenarios, together with its associated group ID. In certain embodiments, the source eNB may provide such configuration (e.g., directly or via a CN function) to the target eNB as an additional information exchanged with the signaling associated to the handover procedure. In certain embodiments, the configuration may already be available at the target eNB. For instance, the eNB that has firstly generated the current configuration may have provided (e.g., directly or via a CN function) such configuration at the time it was generated to all eNBs in the geographical area of reference of the configuration. The target eNB may retrieve the resource pool when the UE performs the handover in which case either the UE indicates the unicast or groupcast ID to which the resource pool is associated or the source eNB indicates the groupcast/unicast ID in the handover request. Upon retrieving the resource configuration already associated to an incoming UE/group of UEs, the target gNB reserves those resources.

The target eNB can perform two actions:

In certain embodiments, the target eNB may decide to continue to use the current SL resource pool configuration. In this case, no further update of the SL resource pool configuration by the target eNB is needed and the target eNB informs the UE(s) via SIB or RRC signaling that it/they can continue to exploit the current configuration. UEs thus continue to exploit the configuration previously received.

In certain embodiments, the target eNB may decide to update the SL resource pool configuration. For instance, due to a change of geographical area of reference, or to some specific local radio conditions at the target eNB (e.g., high level of congestion), or to some updated information coming from the CN. In this case, the target eNB generates an updated configuration as described above in relation to Step 2. The updated configuration is then delivered to UEs as described above in relation to Step 3, and then exploited by UEs for SL communications.

Figure 3:
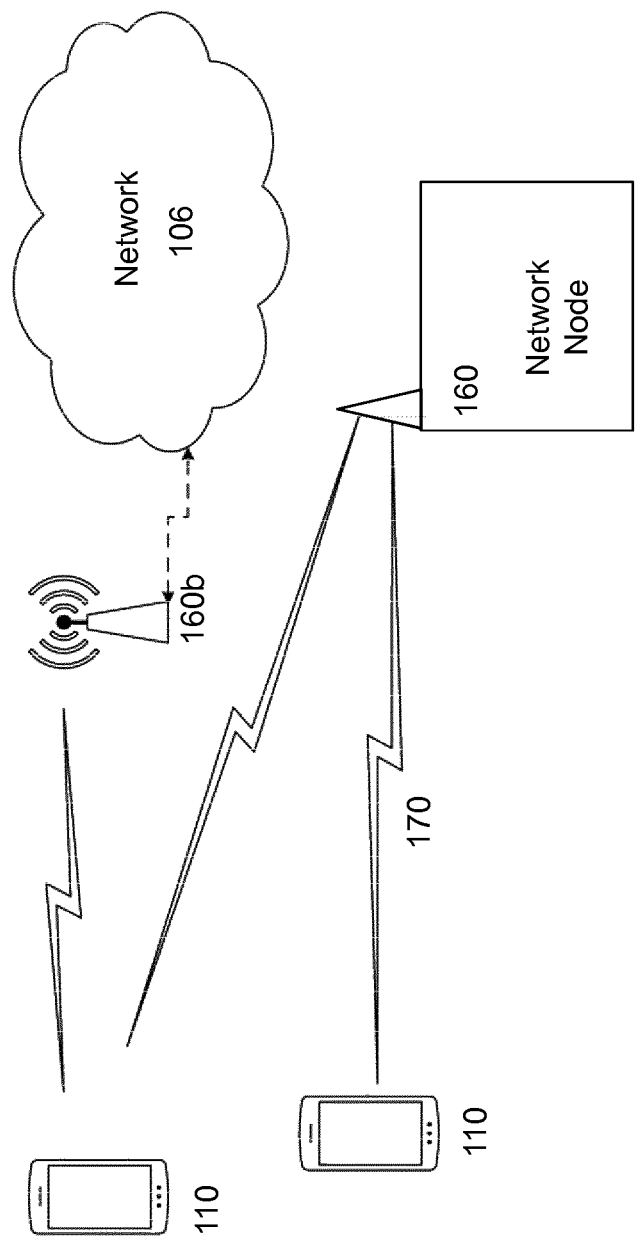
FIG. 3 illustrates an example wireless network, according to certain embodiments.

FIG. 3 illustrates a wireless network in accordance with some embodiments. Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 106, network nodes 160 and 160b, and wireless devices 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 4:
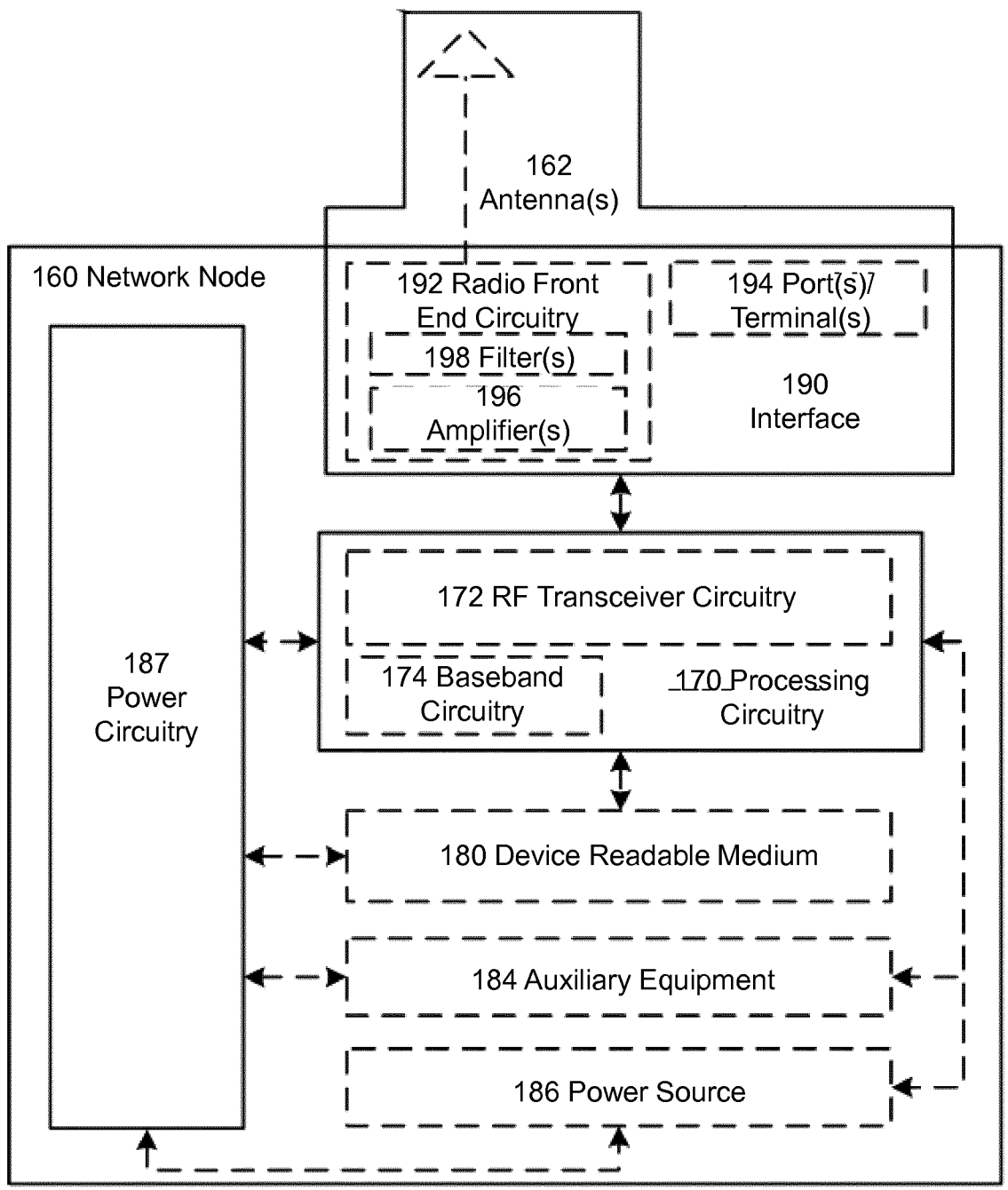
FIG. 4 illustrates an example network node, according to certain embodiments.

FIG. 4 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 160 includes processing circuitry 170, device readable medium 180, interface 190, auxiliary equipment 184, power source 186, power circuitry 187, and antenna 162. Although network node 160 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 4 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 5:
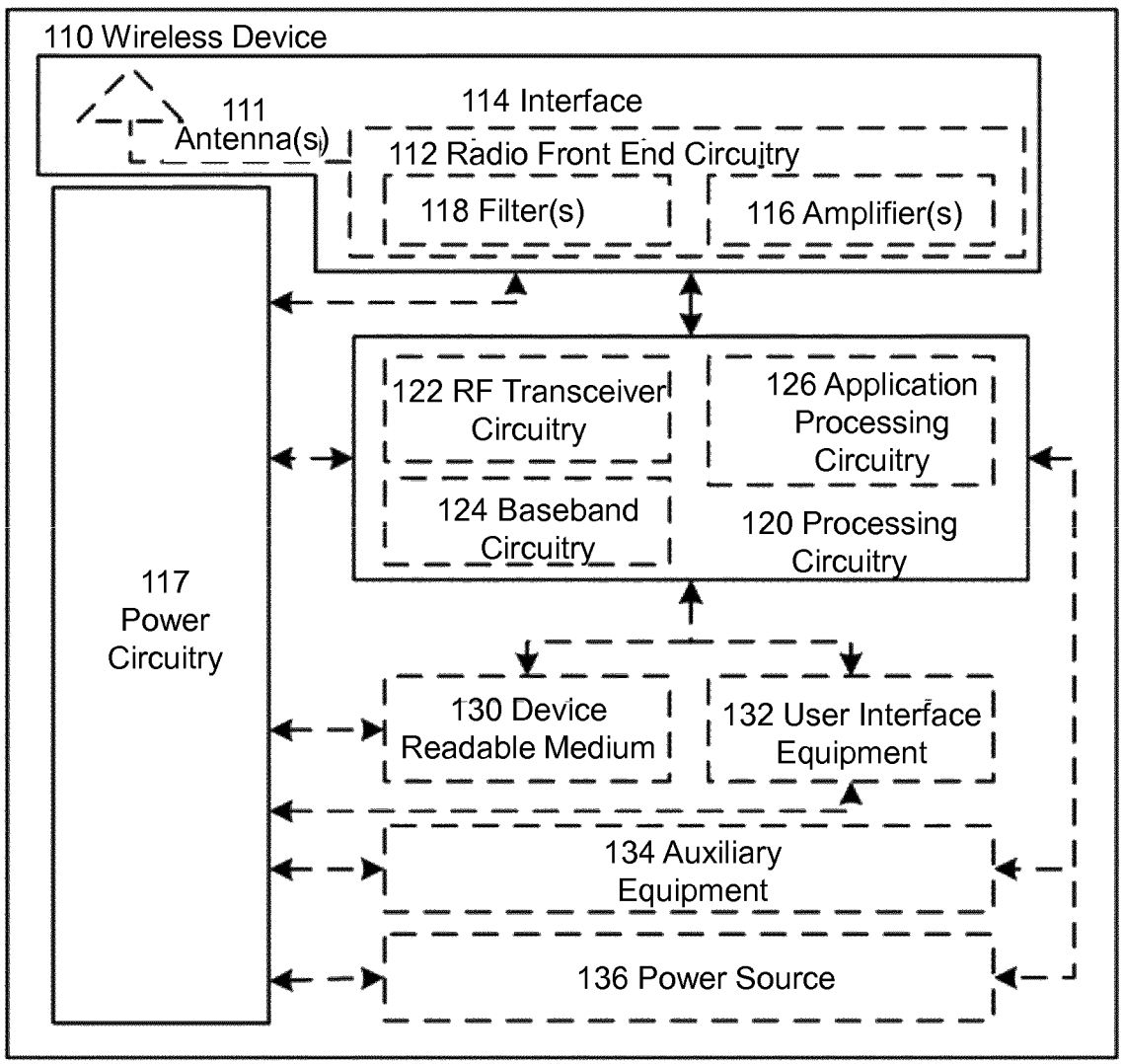
FIG. 5 illustrates an example wireless device, according to certain embodiments.

FIG. 5 illustrates an example wireless device 110, according to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support D2D communication, for example by implementing a 3GPP standard for SL communication, V2V, V2I, V2X and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110. Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111.

Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network, and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. Wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 6:
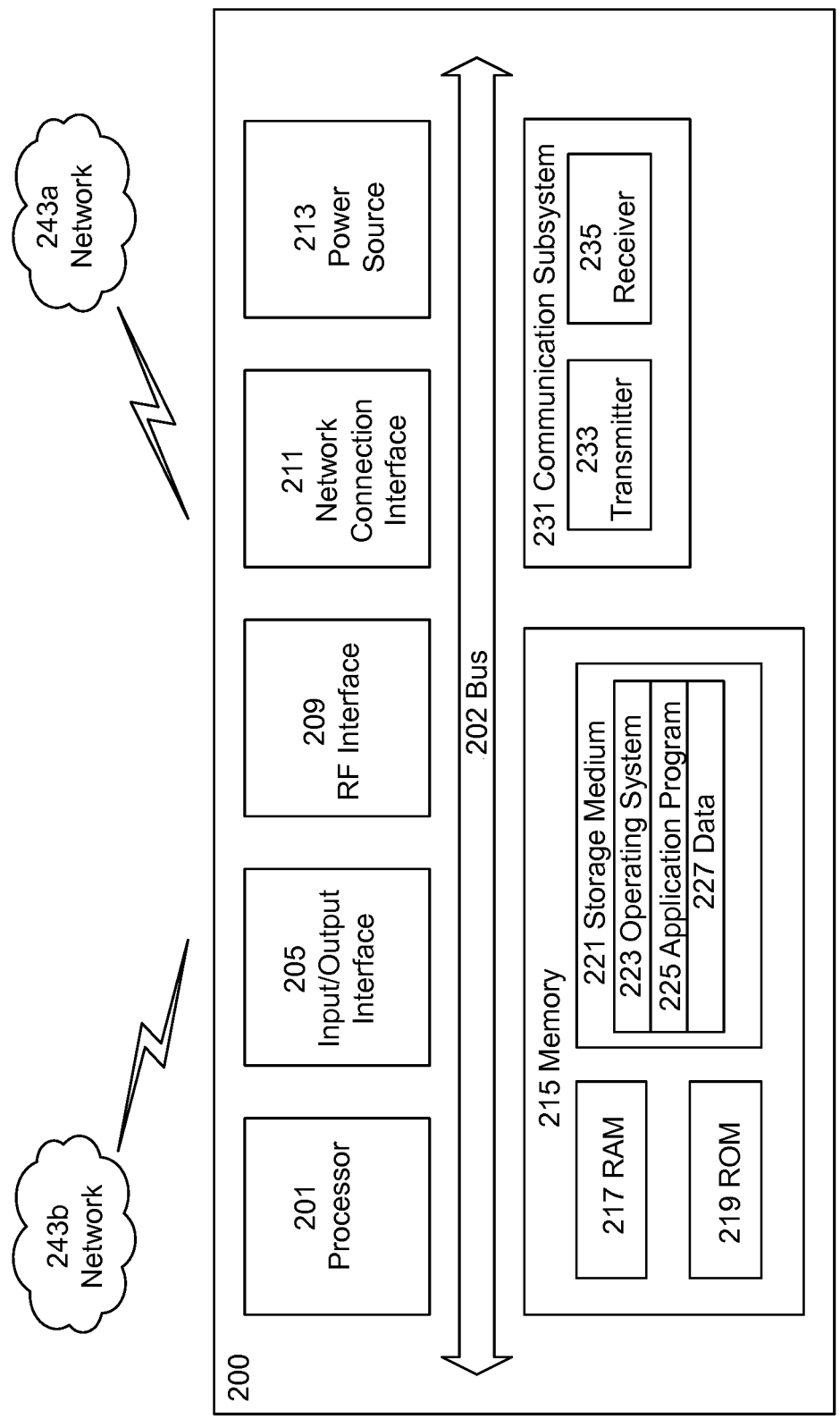
FIG. 6 illustrate an example user equipment, according to certain embodiments.

FIG. 6 illustrates one example embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 6, is one example of a wireless device configured for communication in accordance with one or more communication standards promulgated by the 3$^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 6 is a UE, the components discussed herein are equally applicable to a wireless device, and vice-versa.

In FIG. 6, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 6, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 7:
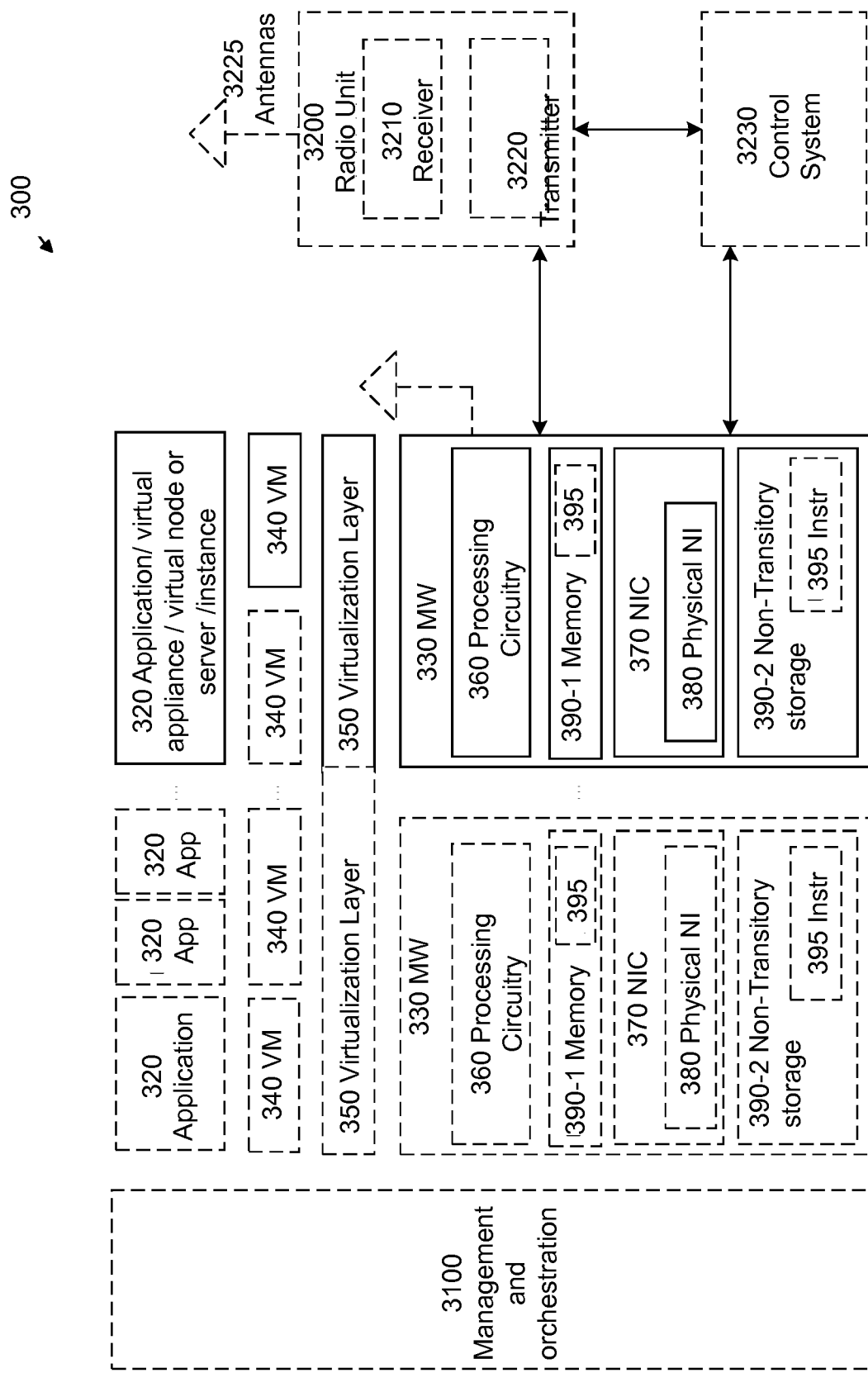
FIG. 7 illustrates a virtualization environment in which functions implemented by some embodiments may be virtualized, according to certain embodiments.

FIG. 7 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 7, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 7.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 8:
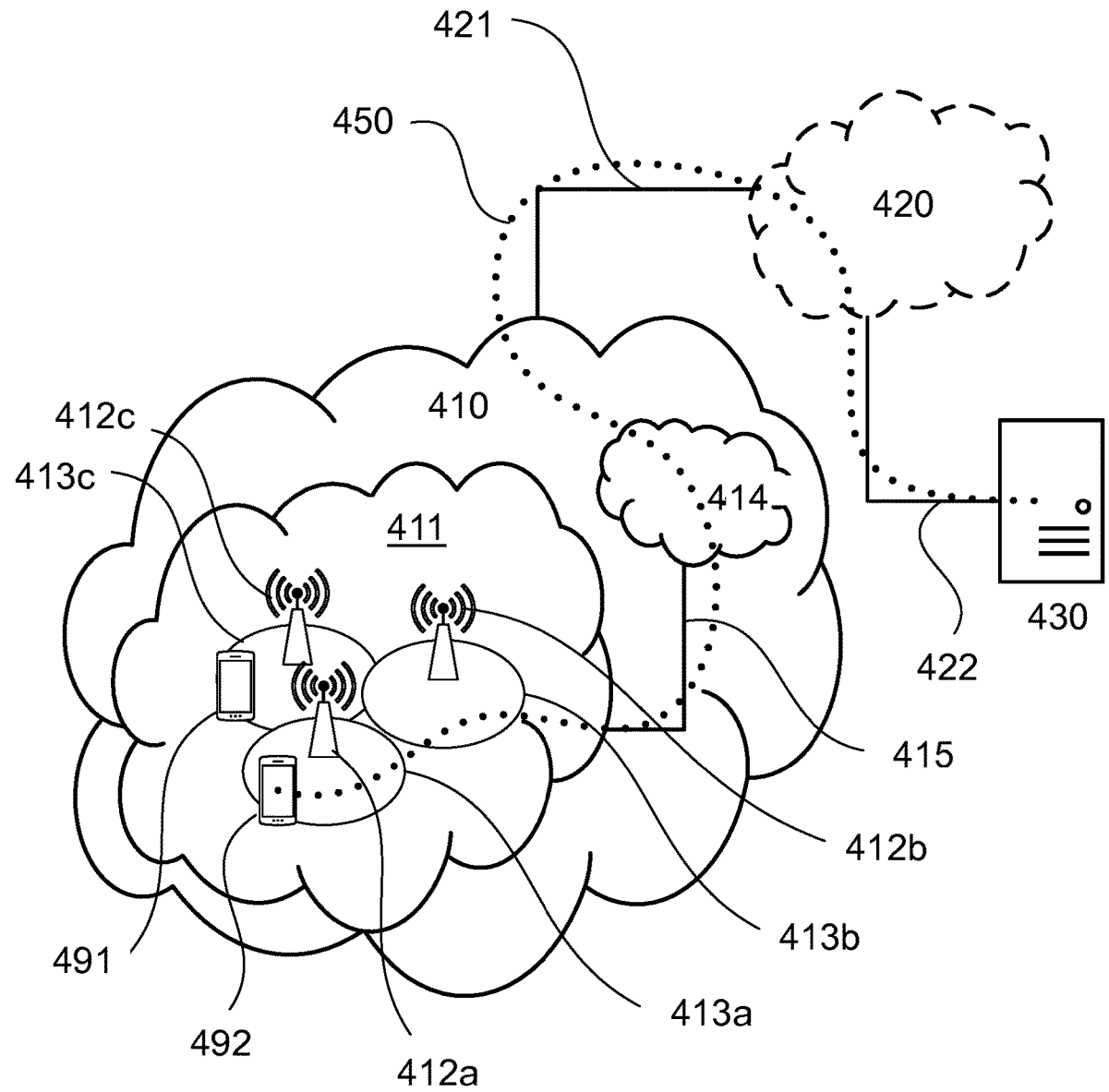
FIG. 8 illustrates a telecommunication network connected via an intermediate network to a host computer, according to certain embodiments.

FIG. 8 illustrates an example telecommunication network connected via an intermediate network to a host computer, in accordance with some embodiments. With reference to FIG. 8, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a wired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 8 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 9:
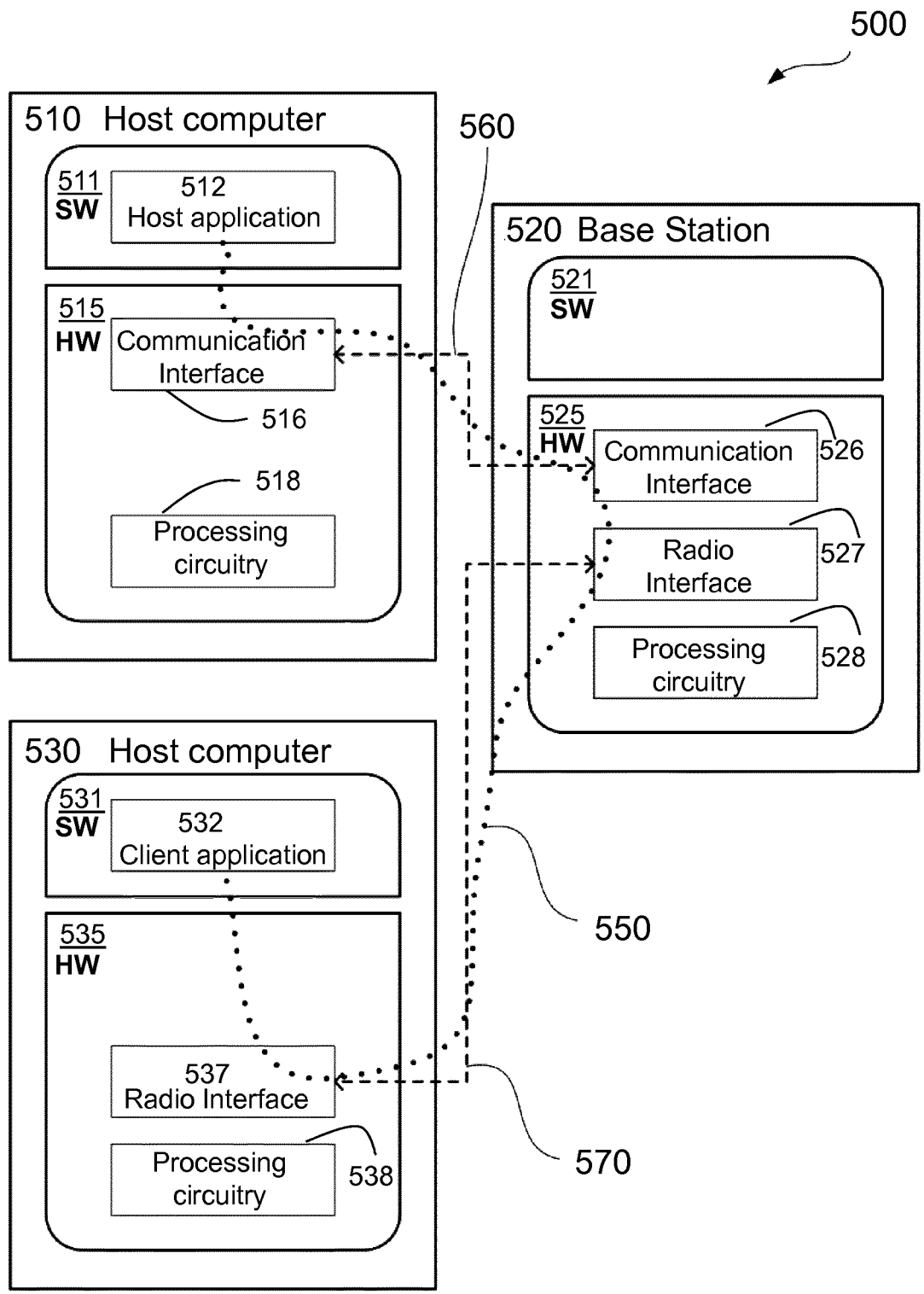
FIG. 9 illustrates a generalized block diagram of a host computer communicating via a base station with a user equipment over a partially wireless connection, according to certain embodiments.

FIG. 9 illustrates a host computer communicating via a base station with a user equipment over a partially wireless connection, in accordance with some embodiments. Example implementations, in accordance with an embodiment, of the UE, base station and host computer discussed in the preceding paragraphs will now be described with reference to FIG. 9. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 9) served by base station 520. Communication interface 526 may be configured to facilitate connection 560 to host computer 510. Connection 560 may be direct or it may pass through a core network (not shown in FIG. 9) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 9 may be similar or identical to host computer 430, one of base stations 412a, 412b, 412c and one of UEs 491, 492 of FIG. 8, respectively. This is to say, the inner workings of these entities may be as shown in FIG. 9 and independently, the surrounding network topology may be that of FIG. 8.

In FIG. 9, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 10, 11:
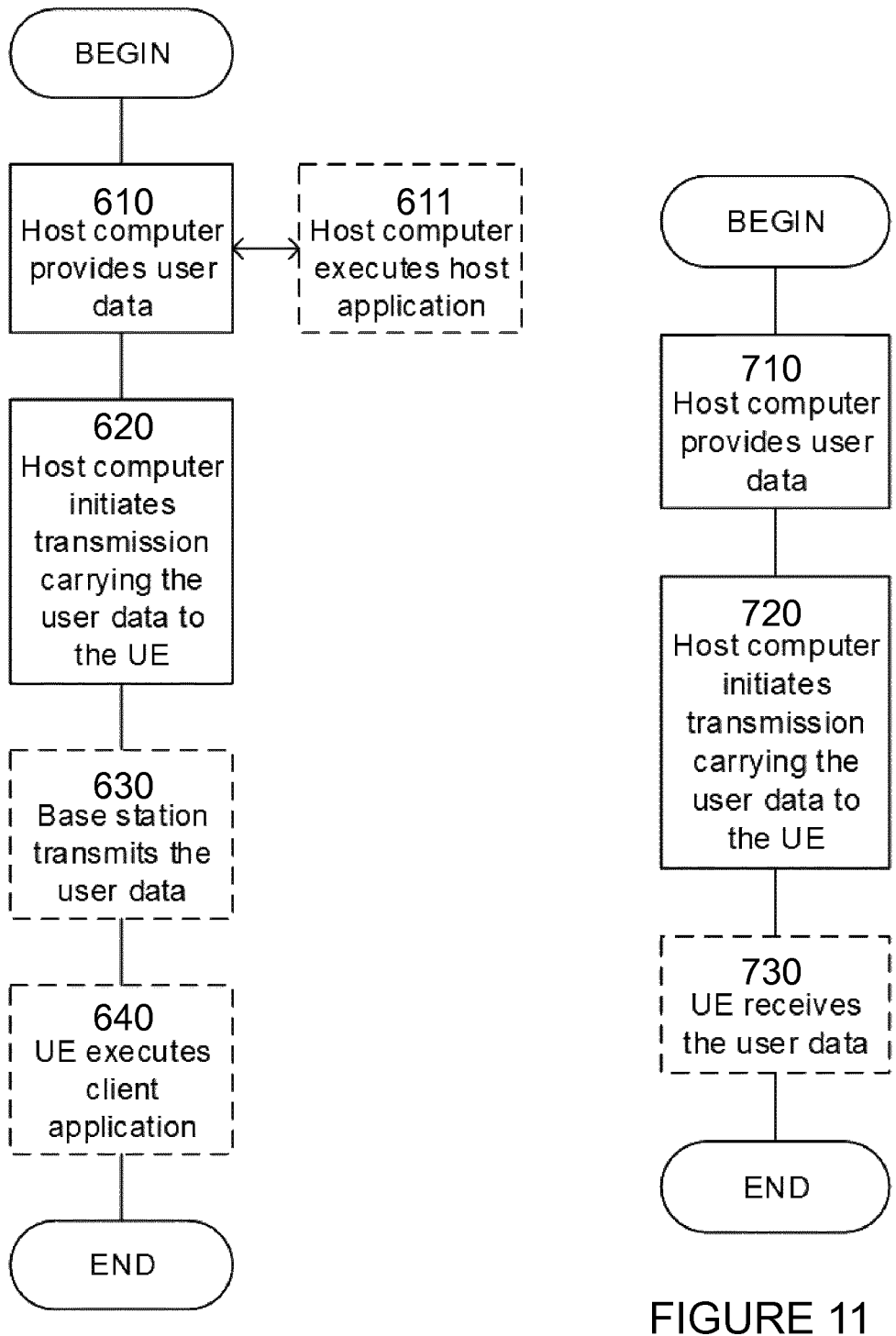
FIG. 10 illustrates a method implemented in a communication system, according to one embodiment.
FIG. 11 illustrates another method implemented in a communication system, according to one embodiment.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 12, 13:
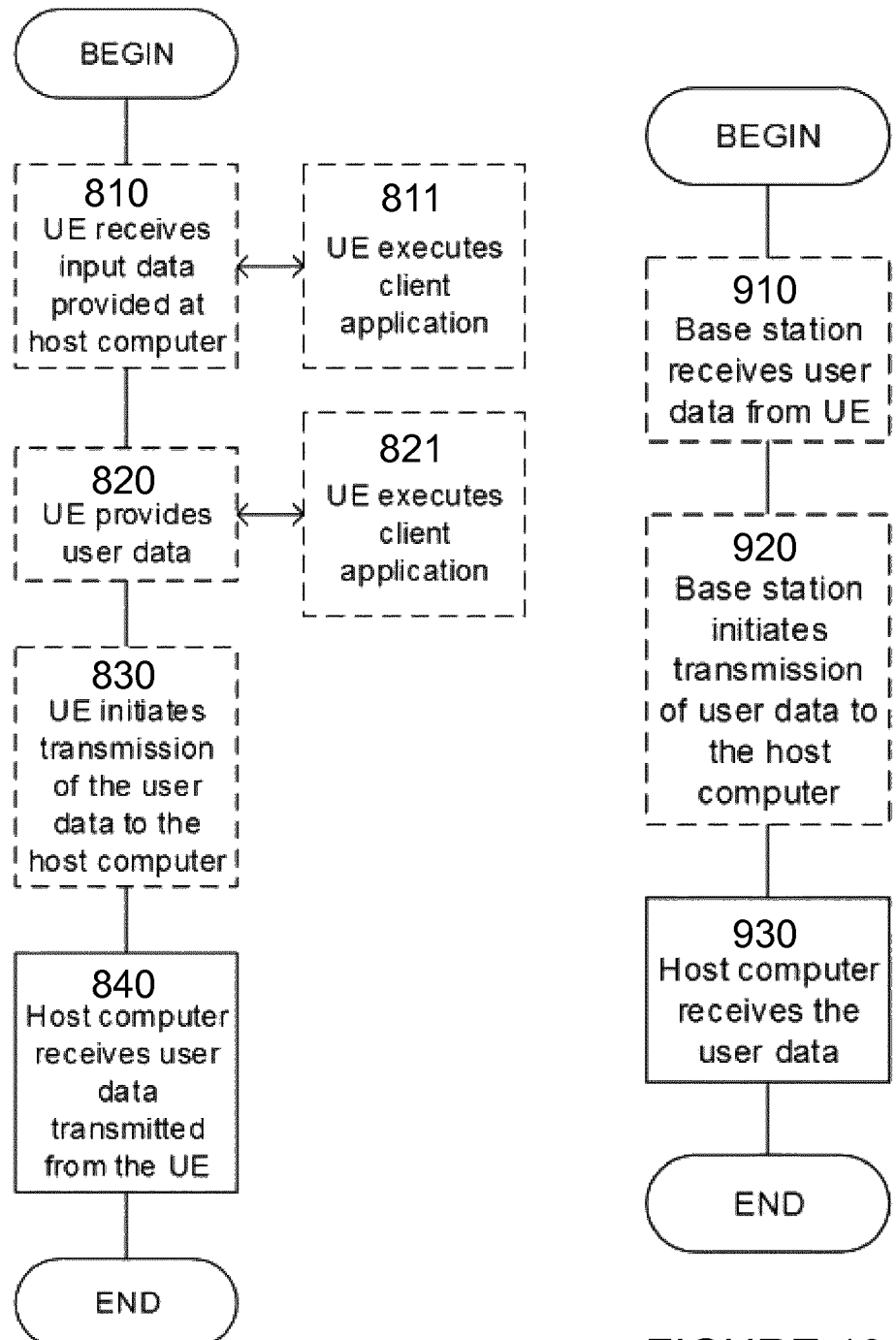
FIG. 12 illustrates another method implemented in a communication system, according to one embodiment.
FIG. 13 illustrates another method implemented in a communication system, according to one embodiment.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 14:
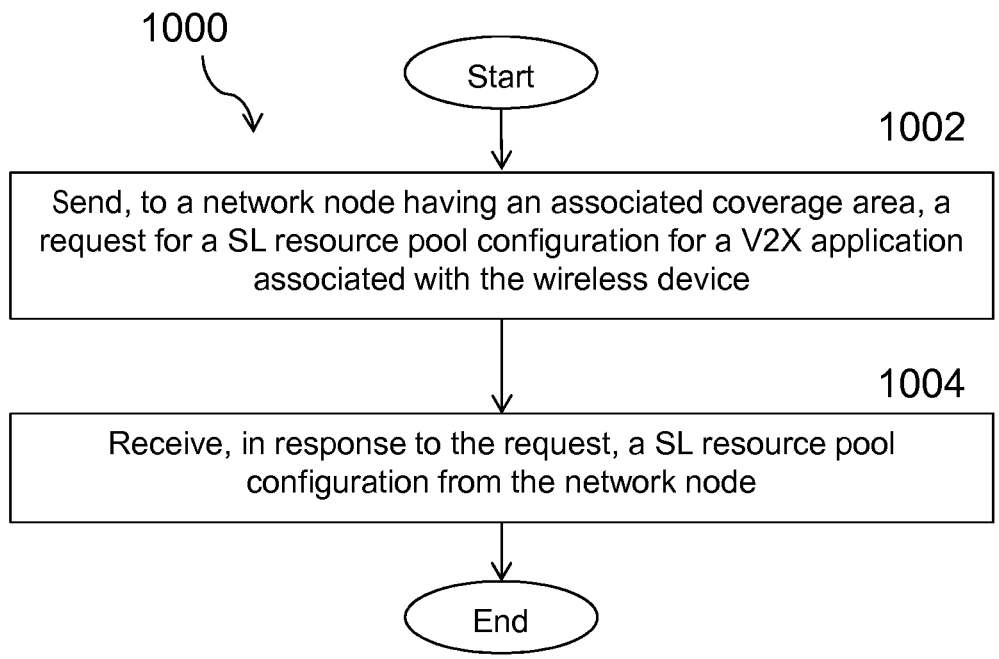
FIG. 14 illustrates an example method by a wireless device, according to certain embodiments.

FIG. 14 depicts a method in a wireless device, in accordance with particular embodiments. The method begins at step 1002, where the wireless device sends, to a network node having an associated coverage area, a request for a SL resource pool configuration for a V2X application associated with the wireless device.

In certain embodiments, the request may be sent upon entering connection establishment with the network node. In certain embodiments, the request may be sent as part of a random-access procedure.

In certain embodiments, the request may be sent in response to a triggering event. In certain embodiments, the triggering event may comprise entering the coverage area associated with the network node. In certain embodiments, the triggering event may comprise determining that the wireless device is configured with a previous SL resource pool configuration that is not valid in a geographical area in which the wireless device is currently located. In certain embodiments, the triggering event may comprise determining that the wireless device is configured with a previous SL resource pool configuration that no longer guarantees one or more quality of service requirements for the V2X application. In certain embodiments, the triggering event may comprise determining that the wireless device is configured with a previous SL resource pool configuration that has expired. In certain embodiments, the triggering event may comprise determining that the wireless device has transitioned from an out-of-coverage scenario to an in-coverage scenario and a previous SL resource pool configuration configured for the out-of-coverage scenario is no longer valid. In certain embodiments, the triggering event may comprise leaving a cell associated with another network node. In certain embodiments, the method may comprise sending a signal indicating that the another network node can release SL resources previously allocated to the wireless device.

In certain embodiments, the request for the SL resource pool configuration may comprise one or more of: one or more geographical area identifiers associated with one or more respective SL resource pool configurations the wireless device would like to receive; an expected or planned route of the wireless device; an indication of a direction in which the wireless device is moving; a speed of the wireless device; a SI-RNTI of a SIB containing a SL resource pool configuration the wireless device would like to receive; an identifier of the V2X application; a type of communication the wireless device is currently involved in; a time duration of the V2X application; capability information for the wireless device; an indication as to whether the wireless device desires a SL resource pool configuration in which resources are autonomously selected by the wireless device or in which resources are scheduled by the network node; a number of wireless devices involved in the V2X application; and an indication as to whether the wireless device needs to release previously configured resources.

In certain embodiments, the method may comprise determining one or more geographical area identifiers associated with one or more of: a geographical area in which the wireless device is located; and a geographical area for which the wireless device would like to receive a SL resource pool configuration. The method may comprise including the one or more geographical area identifiers in the request. In certain embodiments, the one or more geographical area identifiers may be determined based on system information broadcast by the network node.

In certain embodiments, the wireless device may be one of a plurality of wireless devices involved in the V2X application. In certain embodiments, the wireless device may be assigned to send the request for the SL resource pool configuration on behalf of the plurality of wireless devices involved in the V2X application. In certain embodiments, the wireless device may be elected by one or more other wireless devices of the plurality of wireless devices to send the request for the SL resource pool configuration on behalf of the plurality of wireless devices. In certain embodiments, the wireless device may send the request for the SL resource pool configuration in response to entering the coverage area associated with the network node before any other wireless device of the plurality of wireless devices.

At step 1002, the wireless device receives, in response to the request, a SL resource pool configuration from the network node. In certain embodiments, the SL resource pool configuration may comprise information needed to transmit and/or receive data over the SL. In certain embodiments, the information may comprise one or more of: time and frequency resources; a set of transmitting parameters; and a synchronization source. In certain embodiments, the received SL resource pool configuration may be associated with a validity timer.

In certain embodiments, the method may comprise, in response to receiving the SL resource pool configuration from the network node, transmitting the received SL resource pool configuration to one or more additional wireless devices involved with the V2X application.

In certain embodiments, the method may comprise performing one or more transmissions associated with the V2X application according to the received SL resource pool configuration. In certain embodiments, the method may comprise receiving one or more transmissions associated with the V2X application according to the received SL resource pool configuration.

In certain embodiments, the method may comprise entering an IDLE mode after receiving the SL resource pool configuration. In certain embodiments, the method may comprise remaining in a CONNECTED mode after receiving the SL resource pool configuration.

In certain embodiments, the method may comprise: determining that the wireless device has moved to a coverage area associated with a target network node; and sending, to the target network node, an indication of the SL resource pool configuration received by the wireless device.

In certain embodiments, the method may comprise: providing user data; and forwarding the user data to a host computer via the transmission to the network node.

Figure 15:
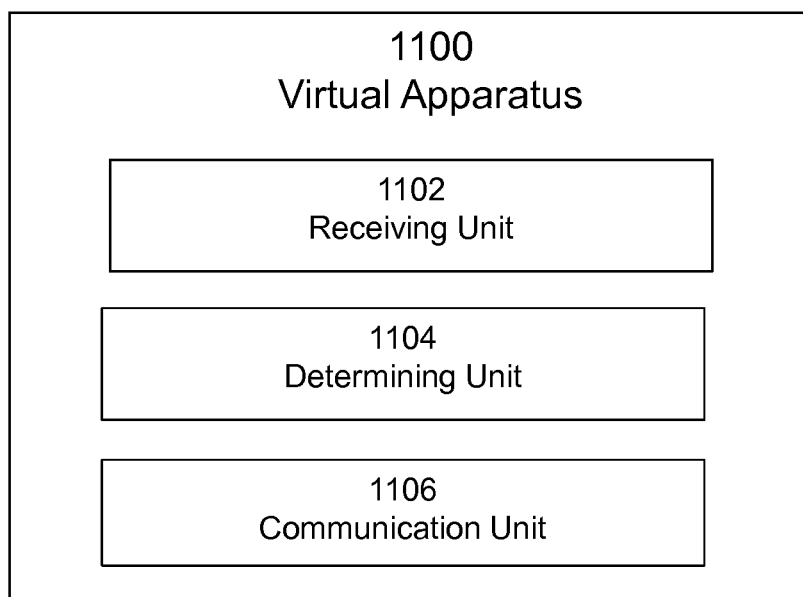
FIG. 15 illustrates an exemplary virtual computing device, according to certain embodiments.

FIG. 15 illustrates a schematic block diagram of an apparatus 1100 in a wireless network (for example, the wireless network shown in FIG. 3). The apparatus may be implemented in a wireless device (e.g., wireless device 110 shown in FIG. 3). Apparatus 1100 is operable to carry out the example method described with reference to FIG. 14 and possibly any other processes or methods disclosed herein. It is also to be understood that the method of FIG. 14 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1102, determining unit 1104, communication unit 1106, and any other suitable units of apparatus 1100 to perform corresponding functions according one or more embodiments of the present disclosure.

In certain embodiments, apparatus 1100 may be a UE. As illustrated in FIG. 15, apparatus 1100 includes receiving unit 1102, determining unit 1104, and communication unit 1106. Receiving unit 1102 may be configured to perform the receiving functions of apparatus 1100. For example, receiving unit 1102 may be configured to receive, in response to the request, a SL resource pool configuration from the network node. As another example, receiving unit 1102 may be configured to receive one or more transmissions associated with the V2X application according to the received SL resource pool configuration.

Receiving unit 1102 may receive any suitable information (e.g., from a wireless device or another network node). Receiving unit 1102 may include a receiver and/or a transceiver, such as RF transceiver circuitry 122 described above in relation to FIG. 5. Receiving unit 1102 may include circuitry configured to receive messages and/or signals (wireless or wired). In particular embodiments, receiving unit 1102 may communicate received messages and/or signals to determining unit 1104 and/or any other suitable unit of apparatus 1100. The functions of receiving unit 1102 may, in certain embodiments, be performed in one or more distinct units.

Determining unit 1104 may perform the processing functions of apparatus 1100. For example, determining unit 1104 may be configured to determine one or more geographical area identifiers associated with one or more of: a geographical area in which the wireless device is located; and a geographical area for which the wireless device would like to receive a SL resource pool configuration. In certain embodiments, determining unit 1104 may be configured to determine the one or more geographical area identifiers based on system information broadcast by the network node. As another example, determining unit 1104 may be configured to include the one or more geographical area identifiers in the request.

As still another example, determining unit 1104 may be configured to send the request in response to a triggering event. In certain embodiments, determining unit 1104 may be configured to determine that the wireless device is configured with a previous SL resource pool configuration that is not valid in a geographical area in which the wireless device is currently located. In certain embodiments, determining unit 1104 may be configured to determine that the wireless device is configured with a previous SL resource pool configuration that no longer guarantees one or more quality of service requirements for the V2X application. In certain embodiments, determining unit 1104 may be configured to determine that the wireless device is configured with a previous SL resource pool configuration that has expired. In certain embodiments, determining unit 1104 may be configured to determine that the wireless device has transitioned from an out-of-coverage scenario to an in-coverage scenario and a previous SL resource pool configuration configured for the out-of-coverage scenario is no longer valid. As another example, determining unit 1104 may be configured to determine to send the request for the SL resource pool configuration in response to entering the coverage area associated with the network node before any other wireless device of the plurality of wireless devices.

As yet another example, determining unit 1104 may be configured to enter an IDLE mode after receiving the SL resource pool configuration. As another example, determining unit 1104 may be configured to remain in a CONNECTED mode after receiving the SL resource pool configuration.

As another example, determining unit 1104 may be configured to determine that the wireless device has moved to a coverage area associated with a target network node.

As another example, determining unit 1104 may be configured to provide user data.

Determining unit 1104 may include or be included in one or more processors, such as processing circuitry 120 described above in relation to FIG. 1. Determining unit 1104 may include analog and/or digital circuitry configured to perform any of the functions of determining unit 1104 and/or processing circuitry 120 described above. The functions of determining unit 1104 may, in certain embodiments, be performed in one or more distinct units.

Communication unit 1106 may be configured to perform the transmission functions of apparatus 1100. For example, communication unit 1106 may be configured to send, to a network node having an associated coverage area, a request for a SL resource pool configuration for a V2X application associated with the wireless device. As another example, communication unit 1106 may be configured to send a signal indicating that the another network node can release SL resources previously allocated to the wireless device. As still another example, communication unit 1106 may be configured to transmit the received SL resource pool configuration to one or more additional wireless devices involved with the V2X application. As yet another example, communication unit 1106 may be configured to perform one or more transmissions associated with the V2X application according to the received SL resource pool configuration. As another example, communication unit 1106 may be configured to send, to the target network node, an indication of the SL resource pool configuration received by the wireless device. As another example, communication unit 1106 may be configured to forward the user data to a host computer via the transmission to the network node.

Communication unit 1106 may transmit messages (e.g., to a wireless device and/or another network node). Communication unit 1106 may include a transmitter and/or a transceiver, such as RF transceiver circuitry 122 described above in relation to FIG. 5. Communication unit 1106 may include circuitry configured to transmit messages and/or signals (e.g., through wireless or wired means). In particular embodiments, communication unit 1106 may receive messages and/or signals for transmission from determining unit 1104 or any other unit of apparatus 1100. The functions of communication unit 1104 may, in certain embodiments, be performed in one or more distinct units.

Figure 16:
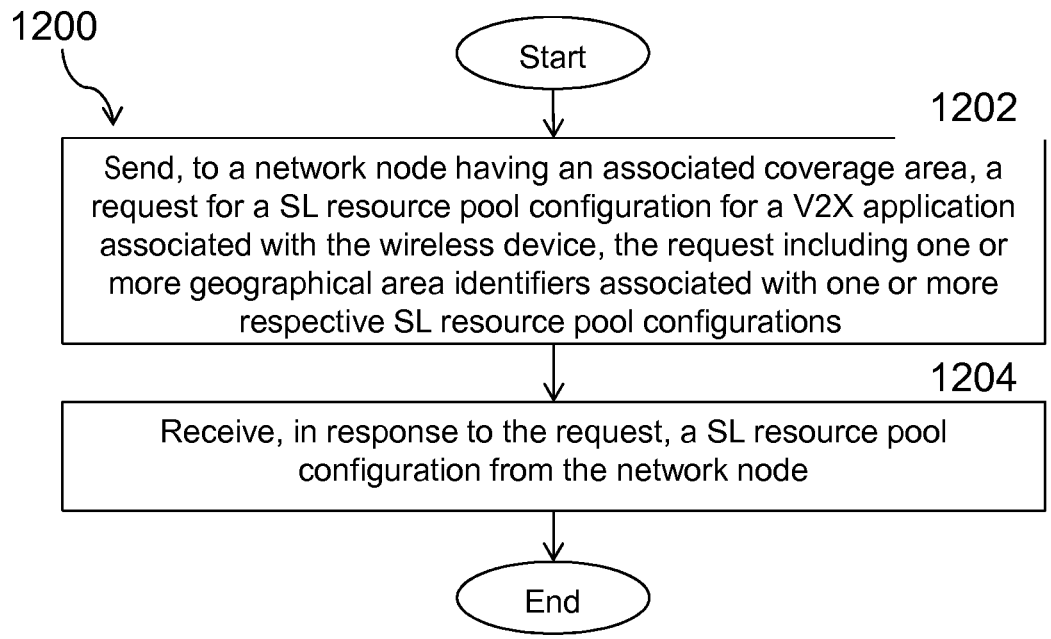
FIG. 16 illustrates another example method by a wireless device, according to certain embodiments.

FIG. 16 depicts a method 1200 in a wireless device 110, in accordance with particular embodiments. The method begins at step 1202 when the wireless device 110 sends, to a network node 160 having an associated coverage area, a request for a SL resource pool configuration for a V2X application associated with the wireless device. The request includes one or more geographical area identifiers associated with one or more respective SL resource pool configurations that the wireless device 110 wants to receive. At step 1204, the wireless device 110 receives, in response to the request, a SL resource pool configuration from the network node.

In a particular embodiment, the SL resource pool configuration includes information needed to transmit and/or receive data over the SL.

In a particular embodiment, the information includes one or more of: time and frequency resources, a set of transmitting parameters, and a synchronization source.

In a particular embodiment, the method further includes determining the one or more geographical area identifiers. The one or more geographical area identifiers are associated with one or more of: a geographical area in which the wireless device 110 is located and a geographical area for which the wireless device 110 would like to receive a SL resource pool configuration.

In a particular embodiment, the one or more geographical area identifiers are determined based on system information broadcast by the network node 160.

In a particular embodiment, the request is sent upon entering connection establishment with the network node 160.

In a particular embodiment, the request is sent as part of a random-access procedure.

In a particular embodiment, the request is sent in response to a triggering event.

In a particular embodiment, the triggering event includes entering the coverage area associated with the network node 160.

In a particular embodiment, the triggering event includes determining that the wireless device 110 is configured with a previous SL resource pool configuration that is not valid in a geographical area in which the wireless device is currently located.

In a particular embodiment, the triggering event includes determining that the wireless device 110 is configured with a previous SL resource pool configuration that no longer guarantees one or more quality of service requirements for the V2X application.

In a particular embodiment, the triggering event includes determining that the wireless device 110 is configured with a previous SL resource pool configuration that has expired. In a further particular embodiment, the triggering event includes determining that the wireless device 110 has transitioned from an out-of-coverage scenario to an in-coverage scenario and a previous SL resource pool configuration configured for the out-of-coverage scenario is no longer valid. In a further particular embodiment, the triggering event includes leaving a cell associated with another network node.

In a particular embodiment, the method further includes sending a signal indicating that the another network node can release SL resources previously allocated to the wireless device 110.

In a particular embodiment, the wireless device 110 is one of a plurality of wireless devices 110 involved in the V2X application.

In a particular embodiment, the wireless device 110 is assigned to send the request for the SL resource pool configuration on behalf of the plurality of wireless devices 110 involved in the V2X application.

In a particular embodiment, the wireless device 110 is elected by one or more other wireless devices 110 of the plurality of wireless devices 110 to send the request for the SL resource pool configuration on behalf of the plurality of wireless devices 110.

In a particular embodiment, the wireless device 110 sends the request for the SL resource pool configuration in response to entering the coverage area associated with the network node 160 before any other wireless device 110 of the plurality of wireless devices 110.

In a particular embodiment, the request for the SL resource pool configuration comprises one or more of: an expected or planned route of the wireless device 110, an indication of a direction in which the wireless device 110 is moving, a speed of the wireless device 110, a SI-RNTI of a SIB containing a SL resource pool configuration the wireless device 110 would like to receive, an identifier of the V2X application, a type of communication the wireless device 110 is currently involved in, a time duration of the V2X application, capability information for the wireless device 110, an indication as to whether the wireless device 110 desires a SL resource pool configuration in which resources are autonomously selected by the wireless device 110 or in which resources are scheduled by the network node 160, a number of wireless devices 110 involved in the V2X application, and an indication as to whether the wireless device 110 needs to release previously configured resources.

In a particular embodiment, the method includes transmitting the received SL resource pool configuration to one or more additional wireless devices 110 involved with the V2X application, in response to receiving the SL resource pool configuration from the network node 160.

In a particular embodiment, the method includes performing one or more transmissions associated with the V2X application according to the received SL resource pool configuration.

In a particular embodiment, the method includes receiving one or more transmissions associated with the V2X application according to the received SL resource pool configuration.

In a particular embodiment, the method further includes entering an IDLE mode after receiving the SL resource pool configuration.

In a particular embodiment, the method further includes remaining in a CONNECTED mode after receiving the SL resource pool configuration.

In a particular embodiment, the received SL resource pool configuration is associated with a validity timer.

In a particular embodiment, the method further includes determining that the wireless device 110 has moved to a coverage area associated with a target network node 160 and sending, to the target network node 160, an indication of the SL resource pool configuration received by the wireless device 110.

Figure 17:
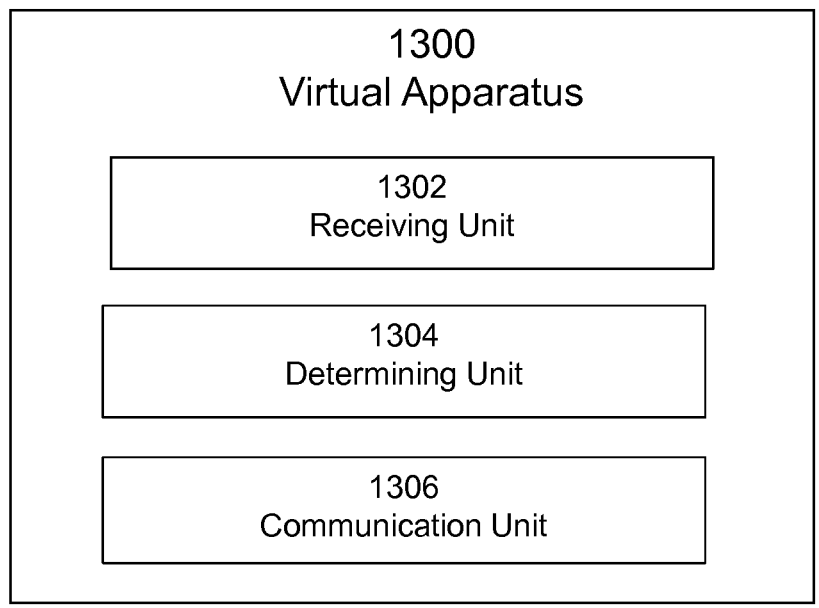
FIG. 17 illustrates another exemplary virtual computing device, according to certain embodiments.

FIG. 17 illustrates a schematic block diagram of an apparatus 1300 in a wireless network (for example, the wireless network shown in FIG. 3). The apparatus may be implemented in a wireless device (e.g., wireless device 110 shown in FIG. 3). Apparatus 1300 is operable to carry out the example method described with reference to FIG. 16 and possibly any other processes or methods disclosed herein. It is also to be understood that the method of FIG. 16 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1302, determining unit 1304, communication unit 1306, and any other suitable units of apparatus 1300 to perform corresponding functions according one or more embodiments of the present disclosure.

In certain embodiments, apparatus 1300 may be a UE. As illustrated in FIG. 17, apparatus 1300 includes receiving unit 1302, determining unit 1304, and communication unit 1306. Receiving unit 1302 may be configured to perform the receiving functions of apparatus 1300. For example, receiving unit 1302 may be configured to receive, in response to the request, a SL resource pool configuration from the network node 160. As another example, receiving unit 1302 may be configured to receive one or more transmissions associated with the V2X application according to the received SL resource pool configuration that the wireless device 110 wants to receive.

Determining unit 1304 may perform the processing functions of apparatus 1300. For example, determining unit 1304 may be configured to determine one or more geographical area identifiers associated with one or more respective SL resource pool configurations.

Communication unit 1106 may be configured to perform the transmission functions of apparatus 1100. For example, communication unit 1106 may be configured to send, to a network node having an associated coverage area, a request for a SL resource pool configuration for a V2X application associated with the wireless device. The request may include one or more geographical area identifiers associated with one or more respective SL resource pool configurations.

Figure 18:
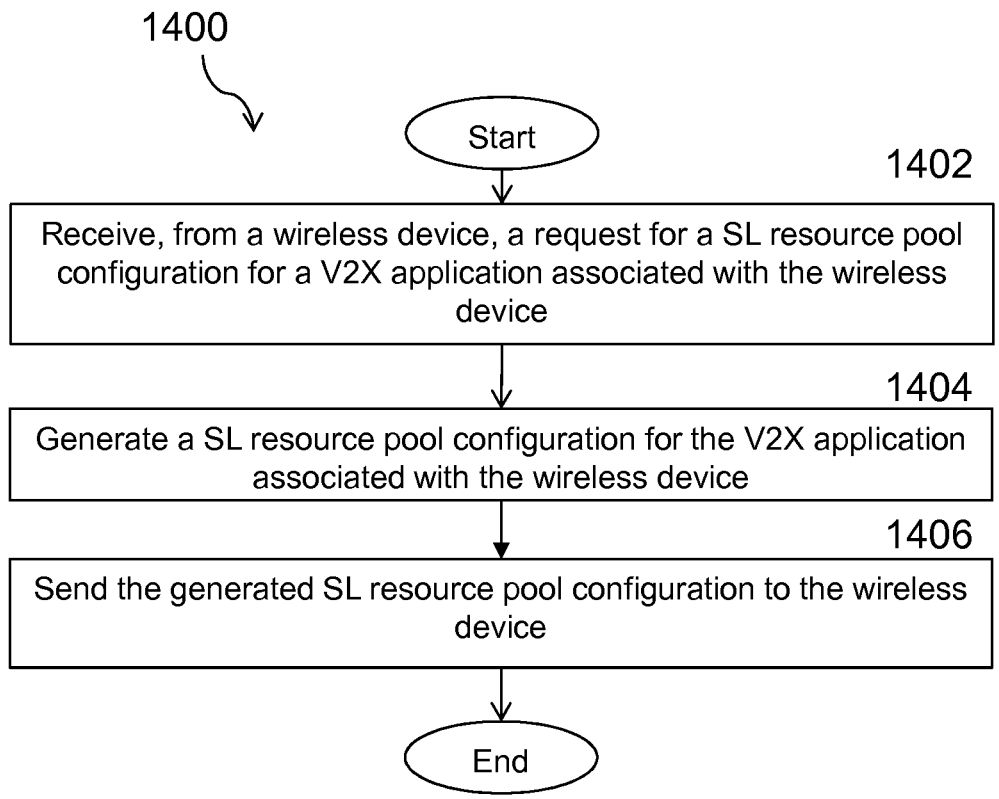
FIG. 18 illustrates an example method by a network node, according to certain embodiments.

FIG. 18 depicts a method 1400 in a network node, accordance with particular embodiments. The method begins at step 1402, where the network node receives, from a wireless device, a request for a SL resource pool configuration for a V2X application associated with the wireless device.

In certain embodiments, the request may comprise one or more geographical area identifiers associated with one or more of: a geographical area in which the wireless device is located; and a geographical area for which the wireless device would like to receive a SL resource pool configuration. In certain embodiments, the request for the SL resource pool configuration may comprise one or more of: one or more geographical area identifiers associated with one or more respective SL resource pool configurations the wireless device would like to receive; an expected or planned route of the wireless device; an indication of a direction in which the wireless device is moving; a speed of the wireless device; a SI-RNTI of a SIB containing a SL resource pool configuration the wireless device would like to receive; an identifier of the V2X application; a type of communication the wireless device is currently involved in; a time duration of the V2X application; capability information for the wireless device; an indication as to whether the wireless device desires a SL resource pool configuration in which resources are autonomously selected by the wireless device or in which resources are scheduled by the network node; a number of wireless devices involved in the V2X application; and an indication as to whether the wireless device needs to release previously configured resources.

At step 1404, the network node generates a SL resource pool configuration for the V2X application associated with the wireless device. In certain embodiments, the SL resource pool configuration may comprise information needed to transmit and/or receive data over the SL. In certain embodiments, the information may comprise one or more of: time and frequency resources; a set of transmitting parameters; and a synchronization source.

In certain embodiments, the SL resource pool configuration may be generated based on one or more criteria. In certain embodiments, the one or more criteria may comprise one or more of: a current and/or expected cell load; a current and/or expected congestion level; a current and/or expected interference level; a type of the V2X application; a quality of service requirement for the V2X application; a type of communication used; resource availability in one or more cells associated with a same geographical area ID.

In certain embodiments, the SL resource pool configuration may be generated based on information received from a core network. In certain embodiments, the information received from the core network may comprise one or more of: subscription information for one or more wireless devices involved in the V2X application; a pre-defined configuration to be used; information related to a service associated with the V2X application; and one or more network-specific policies. In certain embodiments, the SL resource pool configuration may be generated based on a validity of a geographic area associated with the SL resource pool configuration. In certain embodiments, the SL resource pool configuration may be generated based on a time validity associated with the SL resource pool configuration. In certain embodiments, the SL resource pool configuration may be generated based on one or more of a route of the wireless device and a direction of the wireless device.

At step 1406, the network node sends the generated SL resource pool configuration to the wireless device.

In certain embodiments, generating the SL resource pool configuration for the V2X application associated with the wireless device may comprise generating a plurality of SL resource pool configurations for the V2X application associated with the wireless device, and sending the generated SL resource pool configuration to the wireless device may comprise sending the plurality of SL resource pool configurations for the V2X application associated with the wireless device. In certain embodiments, each of the plurality of SL resource pool configurations may be associated with one or more of a geographical area validity and a time duration.

In certain embodiments, the generated SL resource pool configuration may be associated with a geographical area spanning multiple cells. In certain embodiments, the method may comprise sending the generated SL resource pool configuration to one or more network nodes associated with the multiple cells.

In certain embodiments, the method may comprise sending the generated SL resource pool configuration to one or more additional wireless devices involved in the V2X application associated with the wireless device. In certain embodiments, the method may comprise identifying the one or more additional wireless devices involved in the V2X application based on an obtained group ID associating the one or more additional wireless devices with the V2X application.

In certain embodiments, the method may comprise configuring the wireless device to enter an IDLE mode after receiving the generated SL resource pool configuration. In certain embodiments, the method may comprise configuring the wireless device to remain in a CONNECTED mode after receiving the generated SL resource pool configuration.

In certain embodiments, the method may comprise determining that the wireless device is engaging in a handover to a target network node and sending the generated SL resource pool configuration to the target network node. In certain embodiments, the method may comprise receiving an indication that the network node can release SL resources previously allocated to the wireless device.

In certain embodiments, the method may comprise obtaining user data and forwarding the user data to a host computer or a wireless device.

Figure 19:
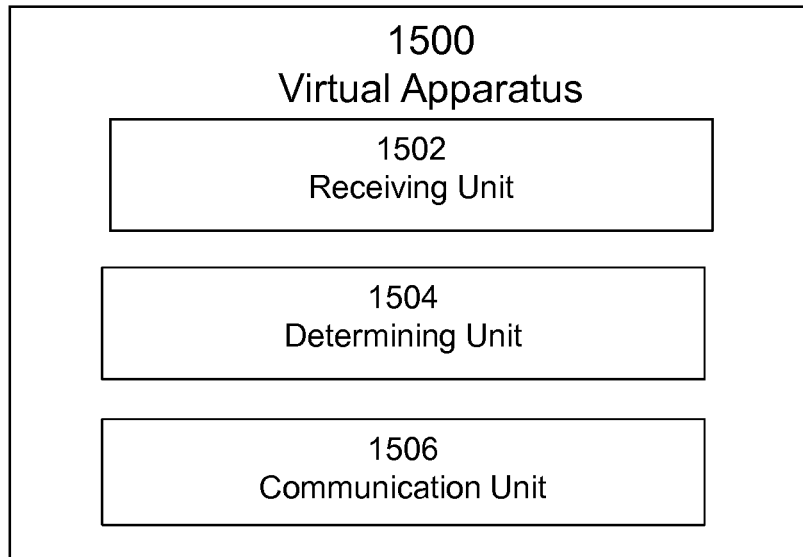
FIG. 19 illustrates another exemplary virtual computing device, according to certain embodiments.

FIG. 19 illustrates a schematic block diagram of an apparatus 1500 in a wireless network (for example, the wireless network shown in FIG. 3). The apparatus may be implemented in a network node (e.g., network node 160 shown in FIG. 3). Apparatus 1500 is operable to carry out the example method described with reference to FIG. 18 and possibly any other processes or methods disclosed herein. It is also to be understood that the method of FIG. 18 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1502, determining unit 1504, communication unit 1506, and any other suitable units of apparatus 1500 to perform corresponding functions according one or more embodiments of the present disclosure.

In certain embodiments, apparatus 1500 may be an eNB or a gNB. As illustrated in FIG. 19, apparatus 1500 includes receiving unit 1502, determining unit 1504, and communication unit 1506. Receiving unit 1502 may be configured to perform the receiving functions of apparatus 1500. For example, receiving unit 1502 may be configured to receive, from a wireless device, a request for a SL resource pool configuration for a V2X application associated with the wireless device. As another example, receiving unit 1502 may be configured to receive an indication that the network node can release SL resources previously allocated to the wireless device. As still another example, receiving unit 1502 may be configured to obtain user data.

Receiving unit 1502 may receive any suitable information (e.g., from a wireless device or another network node). Receiving unit 1502 may include a receiver and/or a transceiver, such as RF transceiver circuitry 172 described above in relation to FIG. 4. Receiving unit 1502 may include circuitry configured to receive messages and/or signals (wireless or wired). In particular embodiments, receiving unit 1502 may communicate received messages and/or signals to determining unit 1504 and/or any other suitable unit of apparatus 1500. The functions of receiving unit 1502 may, in certain embodiments, be performed in one or more distinct units.

Determining unit 1504 may perform the processing functions of apparatus 1500. For example, determining unit 1504 may be configured to generate a SL resource pool configuration for the V2X application associated with the wireless device. In certain embodiments, determining unit 1504 may be configured to generate the SL resource pool configuration based on one or more criteria. In certain embodiments, determining unit 1504 may be configured to generate the SL resource pool configuration based on information received from a core network. In certain embodiments, determining unit 1504 may be configured to generate the SL resource pool configuration based on a validity of a geographic area associated with the SL resource pool configuration. In certain embodiments, determining unit 1504 may be configured to generate the SL resource pool configuration based on a time validity associated with the SL resource pool configuration. In certain embodiments, determining unit 1504 may be configured to generate the SL resource pool configuration based on one or more of a route of the wireless device and a direction of the wireless device. In certain embodiments, determining unit 1504 may be configured to generate a plurality of SL resource pool configurations for the V2X application associated with the wireless device.

As another example, determining unit 1504 may be configured to identify one or more additional wireless devices involved in the V2X application based on an obtained group ID associating the one or more additional wireless devices with the V2X application.

As still another example, determining unit 1504 may be configured to configure the wireless device to enter an IDLE mode after receiving the generated SL resource pool configuration. As yet another example, determining unit 1504 may be configured to configure the wireless device to remain in a CONNECTED mode after receiving the generated SL resource pool configuration.

As another example, determining unit 1504 may be configured to determine that the wireless device is engaging in a handover to a target network node.

Determining unit 1504 may include or be included in one or more processors, such as processing circuitry 170 described above in relation to FIG. 4. Determining unit 1504 may include analog and/or digital circuitry configured to perform any of the functions of determining unit 1504 and/or processing circuitry 170 described above. The functions of determining unit 1504 may, in certain embodiments, be performed in one or more distinct units.

Communication unit 1506 may be configured to perform the transmission functions of apparatus 1500. For example, communication unit 1506 may be configured to send the generated SL resource pool configuration to the wireless device. In certain embodiments, communication unit 1506 may be configured to send the plurality of SL resource pool configurations for the V2X application associated with the wireless device. In certain embodiments, communication unit 1506 may be configured to send the generated SL resource pool configuration to one or more network nodes associated with the multiple cells. In certain embodiments, communication unit 1506 may be configured to send the generated SL resource pool configuration to one or more additional wireless devices involved in the V2X application associated with the wireless device.

As another example, communication unit 1506 may be configured to send the generated SL resource pool configuration to the target network node.

As still another example, communication unit 1506 may be configured to forward the user data to a host computer or a wireless device.

Communication unit 1506 may transmit messages (e.g., to a wireless device and/or another network node). Communication unit 1506 may include a transmitter and/or a transceiver, such as RF transceiver circuitry 172 described above in relation to FIG. 4. Communication unit 1506 may include circuitry configured to transmit messages and/or signals (e.g., through wireless or wired means). In particular embodiments, communication unit 1506 may receive messages and/or signals for transmission from determining unit 1504 or any other unit of apparatus 1500. The functions of communication unit 1504 may, in certain embodiments, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 20:
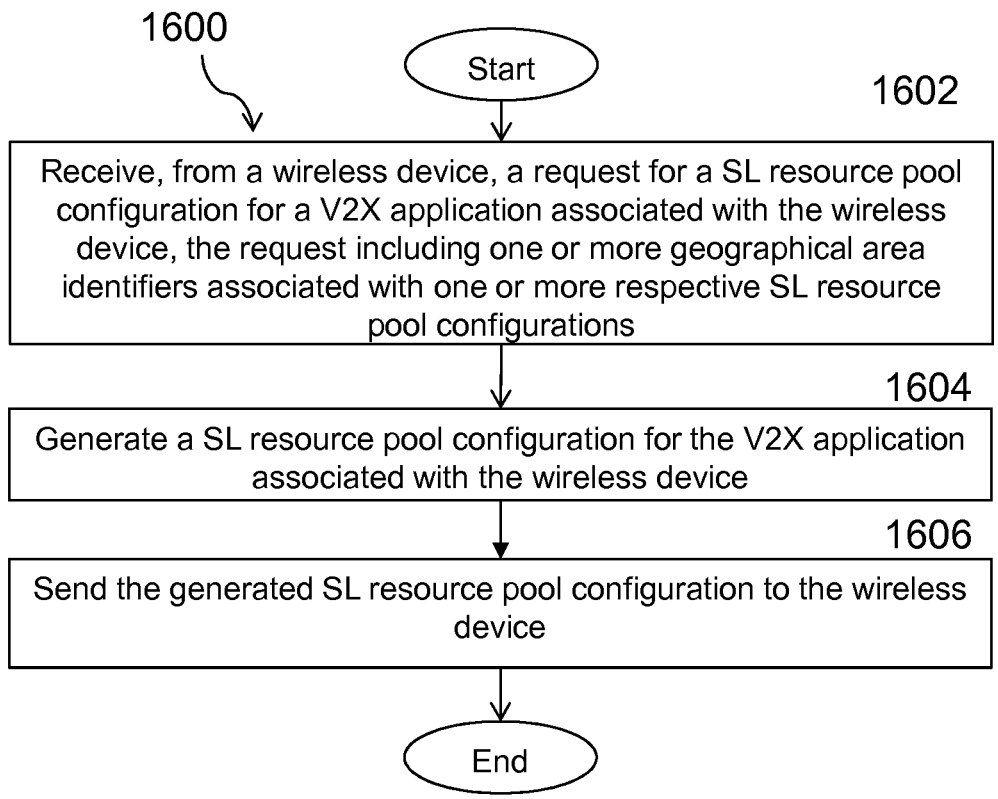
FIG. 20 illustrates another example method by a network node, according to certain embodiments.

FIG. 20 depicts a method 1600 in a network node 160, accordance with particular embodiments. The method begins at step 1602, where the network node 160 receives, from a wireless device 110, a request for a SL resource pool configuration for a V2X application associated with the wireless device 110. The request includes one or more geographical area identifiers associated with one or more respective SL resource pool configurations that the wireless device 110 wants to receive. At step 1604, the wireless device 110 generates a SL resource pool configuration for the V2X application associated with the wireless device 110. At step 1606, the wireless device 110 sends the generated SL resource pool configuration to the wireless device 110.

In a particular embodiment, the SL resource pool configuration comprises information needed to transmit and/or receive data over the SL.

In a particular embodiment, the information comprises one or more of: time and frequency resources; a set of transmitting parameters; and a synchronization source.

In a particular embodiment, the one or more geographical area identifiers are associated with one or more of: a geographical area in which the wireless device 110 is located and a geographical area for which the wireless device 110 would like to receive a SL resource pool configuration.

In a particular embodiment, the request for the SL resource pool configuration comprises one or more of: an expected or planned route of the wireless device 110; an indication of a direction in which the wireless device 110 is moving; a speed of the wireless device 110; a SI-RNTI of a SIB containing a SL resource pool configuration the wireless device 110 would like to receive; an identifier of the V2X application; a type of communication the wireless device 110 is currently involved in; a time duration of the V2X application; capability information for the wireless device 110; an indication as to whether the wireless device 110 desires a SL resource pool configuration in which resources are autonomously selected by the wireless device 110 or in which resources are scheduled by the network node 160; a number of wireless devices 110 involved in the V2X application; and an indication as to whether the wireless device 110 needs to release previously configured resources.

In a particular embodiment, the SL resource pool configuration is generated based on one or more criteria.

In a particular embodiment, the one or more criteria comprise one or more of: a current and/or expected cell load; a current and/or expected congestion level; a current and/or expected interference level; a type of the V2X application; a quality of service (QoS) requirement for the V2X application; a type of communication used; and resource availability in one or more cells associated with a same geographical area ID.

In a particular embodiment, the SL resource pool configuration is generated based on information received from a core network.

In a particular embodiment, the information received from the core network comprises one or more of: subscription information for one or more wireless devices 110 involved in the V2X application; a pre-defined configuration to be used; information related to a service associated with the V2X application; and one or more network-specific policies.

In a particular embodiment, the SL resource pool configuration is generated based on a validity of a geographic area associated with the SL resource pool configuration.

In a particular embodiment, the SL resource pool configuration is generated based on a time validity associated with the SL resource pool configuration.

In a particular embodiment, the SL resource pool configuration is generated based on one or more of a route of the wireless device 110 and a direction of the wireless device 110.

In a particular embodiment, generating the SL resource pool configuration for the V2X application associated with the wireless device comprises generating a plurality of SL resource pool configurations for the V2X application associated with the wireless device and sending the generated SL resource pool configuration to the wireless device comprises sending the plurality of SL resource pool configurations for the V2X application associated with the wireless device.

In a particular embodiment, each of the plurality of SL resource pool configurations is associated with one or more of a geographical area validity and a time duration.

In a particular embodiment, the generated SL resource pool configuration is associated with a geographical area spanning multiple cells.

In a particular embodiment, the method further includes sending the generated SL resource pool configuration to one or more network nodes associated with the multiple cells.

In a particular embodiment, the method further includes sending the generated SL resource pool configuration to one or more additional wireless devices 110 involved in the V2X application associated with the wireless device 110.

In a particular embodiment, the method further includes identifying the one or more additional wireless devices 110 involved in the V2X application based on an obtained group ID associating the one or more additional wireless devices 110 with the V2X application.

In a particular embodiment, the method further includes configuring the wireless device 110 to enter an IDLE mode after receiving the generated SL resource pool configuration. In yet another embodiment, the method further includes configuring the wireless device 110 to remain in a CONNECTED mode after receiving the generated SL resource pool configuration.

In a particular embodiment, the method further includes determining that the wireless device 110 is engaging in a handover to a target network node 160 and sending the generated SL resource pool configuration to the target network node 160.

In a particular embodiment, the method further includes receiving an indication that the network node 160 can release SL resources previously allocated to the wireless device 110.

Figure 21:
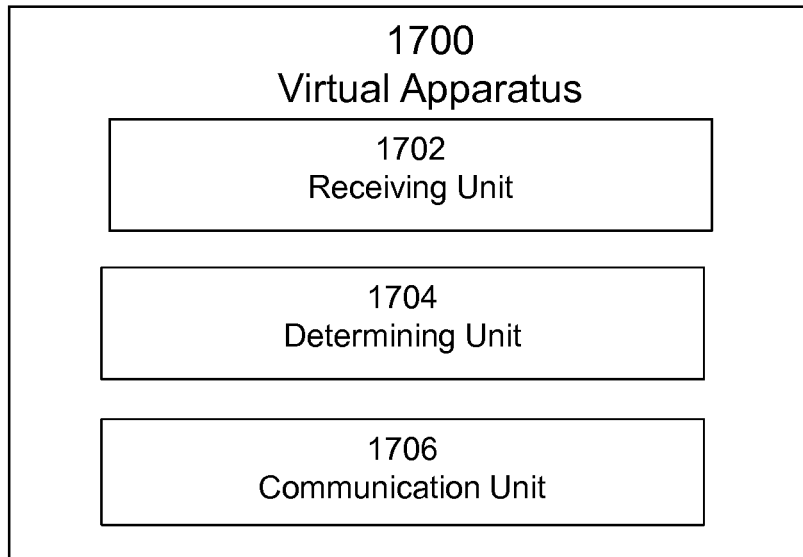
FIG. 21 illustrates another exemplary virtual computing device, according to certain embodiments.

FIG. 21 illustrates a schematic block diagram of an apparatus 1700 in a wireless network (for example, the wireless network shown in FIG. 3). The apparatus may be implemented in a network node (e.g., network node 160 shown in FIG. 3). Apparatus 1700 is operable to carry out the example method described with reference to FIG. 20 and possibly any other processes or methods disclosed herein. It is also to be understood that the method of FIG. 20 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1702, determining unit 1704, communication unit 1706, and any other suitable units of apparatus 1700 to perform corresponding functions according one or more embodiments of the present disclosure.

In certain embodiments, apparatus 1700 may be an eNB or a gNB. As illustrated in FIG. 21, apparatus 1700 includes receiving unit 1702, determining unit 1704, and communication unit 1706. Receiving unit 1702 may be configured to perform the receiving functions of apparatus 1700. For example, receiving unit 1702 may be configured to receive, from a wireless device 110, a request for a SL resource pool configuration for a V2X application associated with the wireless device 110. The request may include one or more geographical area identifiers associated with one or more respective SL resource pool configurations that the wireless device 110 wants to receive.

Determining unit 1704 may perform the processing functions of apparatus 1700. For example, determining unit 1704 may be configured to generate a SL resource pool configuration for the V2X application associated with the wireless device 110.

Communication unit 1706 may be configured to perform the transmission functions of apparatus 1700. For example, communication unit 1706 may be configured to send the generated SL resource pool configuration to the wireless device 110.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

EXAMPLE EMBODIMENTS

Group A Embodiments

Embodiment 1. A method performed by a wireless device, the method comprising:
    sending, to a network node having an associated coverage area, a request for a sidelink (SL) resource pool configuration for a V2X application associated with the wireless device; and
    receiving, in response to the request, a SL resource pool configuration from the network node.

Embodiment 2. The method of embodiment 1, wherein the SL resource pool configuration comprises information needed to transmit and/or receive data over the SL.

Embodiment 3. The method of embodiment 2, wherein the information comprises one or more of: time and frequency resources; a set of transmitting parameters; and a synchronization source.

Embodiment 4. The method of any of embodiments 1-3, further comprising determining one or more geographical area identifiers associated with one or more of: a geographical area in which the wireless device is located; and a geographical area for which the wireless device would like to receive a SL resource pool configuration; and including the one or more geographical area identifiers in the request.

Embodiment 5. The method of embodiment 4, wherein the one or more geographical area identifiers are determined based on system information broadcast by the network node.

Embodiment 6. The method of any of embodiments 1-5, wherein the request is sent upon entering connection establishment with the network node.

Embodiment 7. The method of any of embodiments 1-5, wherein the request is sent as part of a random-access procedure.

Embodiment 8. The method of any of embodiments 1-7, wherein the request is sent in response to a triggering event.

Embodiment 9. The method of embodiment 8, wherein the triggering event comprises entering the coverage area associated with the network node.

Embodiment 10. The method of embodiment 8, wherein the triggering event comprises determining that the wireless device is configured with a previous SL resource pool configuration that is not valid in a geographical area in which the wireless device is currently located.

Embodiment 11. The method of embodiment 8, wherein the triggering event comprises determining that the wireless device is configured with a previous SL resource pool configuration that no longer guarantees one or more quality of service requirements for the V2X application.

Embodiment 12. The method of embodiment 8, wherein the triggering event comprises determining that the wireless device is configured with a previous SL resource pool configuration that has expired.

Embodiment 13. The method of embodiment 8, wherein the triggering event comprises determining that the wireless device has transitioned from an out-of-coverage scenario to an in-coverage scenario and a previous SL resource pool configuration configured for the out-of-coverage scenario is no longer valid.

Embodiment 14. The method of embodiment 8, wherein the triggering event comprises leaving a cell associated with another network node.

Embodiment 15. The method of embodiment 14, further comprising sending a signal indicating that the another network node can release SL resources previously allocated to the wireless device.

Embodiment 16. The method of any of embodiments 1-15, wherein the wireless device is one of a plurality of wireless devices involved in the V2X application.

Embodiment 17. The method of embodiment 16, wherein the wireless device is assigned to send the request for the SL resource pool configuration on behalf of the plurality of wireless devices involved in the V2X application.

Embodiment 18. The method of embodiment 17, wherein the wireless device is elected by one or more other wireless devices of the plurality of wireless devices to send the request for the SL resource pool configuration on behalf of the plurality of wireless devices.

Embodiment 19. The method of embodiment 17, wherein the wireless device sends the request for the SL resource pool configuration in response to entering the coverage area associated with the network node before any other wireless device of the plurality of wireless devices.

Embodiment 20. The method of any of embodiments 1-19, wherein the request for the SL resource pool configuration comprises one or more of: one or more geographical area identifiers associated with one or more respective SL resource pool configurations the wireless device would like to receive; an expected or planned route of the wireless device; an indication of a direction in which the wireless device is moving; a speed of the wireless device; a System Information Radio Network Temporary Identifier (SI-RNTI) of a system information block (SIB) containing a SL resource pool configuration the wireless device would like to receive; an identifier of the V2X application; a type of communication the wireless device is currently involved in; a time duration of the V2X application; capability information for the wireless device; an indication as to whether the wireless device desires a SL resource pool configuration in which resources are autonomously selected by the wireless device or in which resources are scheduled by the network node; a number of wireless devices involved in the V2X application; and an indication as to whether the wireless device needs to release previously configured resources.

Embodiment 21. The method of any of embodiments 1-20, further comprising in response to receiving the SL resource pool configuration from the network node, transmitting the received SL resource pool configuration to one or more additional wireless devices involved with the V2X application.

Embodiment 22. The method of any of embodiments 1-20, further comprising performing one or more transmissions associated with the V2X application according to the received SL resource pool configuration.

Embodiment 23. The method of any of embodiments 1-21, further comprising receiving one or more transmissions associated with the V2X application according to the received SL resource pool configuration.

Embodiment 24. The method of any of embodiments 1-23, further comprising entering an IDLE mode after receiving the SL resource pool configuration.

Embodiment 25. The method of any of embodiments 1-23, further comprising remaining in a CONNECTED mode after receiving the SL resource pool configuration.

Embodiment 26. The method of any of embodiments 1-25, wherein the received SL resource pool configuration is associated with a validity timer.

Embodiment 27. The method of any of embodiments 1-26, further comprising: determining that the wireless device has moved to a coverage area associated with a target network node; and sending, to the target network node, an indication of the SL resource pool configuration received by the wireless device.

Embodiment 28. The method of any of embodiments 1-27, further comprising: providing user data; and forwarding the user data to a host computer via the transmission to the network node.

Group B Embodiments

Embodiment 29. A method performed by a network node, the method comprising:
receiving, from a wireless device, a request for a sidelink (SL) resource pool configuration for a V2X application associated with the wireless device;
generating a SL resource pool configuration for the V2X application associated with the wireless device; and
sending the generated SL resource pool configuration to the wireless device. Embodiment 30. The method of embodiment 29, wherein the SL resource pool configuration comprises information needed to transmit and/or receive data over the SL.

Embodiment 31. The method of embodiment 30, wherein the information comprises one or more of: time and frequency resources; a set of transmitting parameters; and a synchronization source.

Embodiment 32. The method of any of embodiments 29-31, wherein the request comprises one or more geographical area identifiers associated with one or more of: a geographical area in which the wireless device is located; and a geographical area for which the wireless device would like to receive a SL resource pool configuration.

Embodiment 33. The method of any of embodiments 29-32, wherein the request for the SL resource pool configuration comprises one or more of: one or more geographical area identifiers associated with one or more respective SL resource pool configurations the wireless device would like to receive; an expected or planned route of the wireless device; an indication of a direction in which the wireless device is moving; a speed of the wireless device; a System Information Radio Network Temporary Identifier (SI-RNTI) of a system information block (SIB) containing a SL resource pool configuration the wireless device would like to receive; an identifier of the V2X application; a type of communication the wireless device is currently involved in; a time duration of the V2X application; capability information for the wireless device; an indication as to whether the wireless device desires a SL resource pool configuration in which resources are autonomously selected by the wireless device or in which resources are scheduled by the network node; a number of wireless devices involved in the V2X application; and an indication as to whether the wireless device needs to release previously configured resources.

Embodiment 34. The method of any of embodiments 29-33, wherein the SL resource pool configuration is generated based on one or more criteria.

Embodiment 35. The method of embodiment 34, wherein the one or more criteria comprise one or more of: a current and/or expected cell load; a current and/or expected congestion level; a current and/or expected interference level; a type of the V2X application; a quality of service (QoS) requirement for the V2X application; a type of communication used; resource availability in one or more cells associated with a same geographical area ID.

Embodiment 36. The method of any of embodiments 29-35, wherein the SL resource pool configuration is generated based on information received from a core network.

Embodiment 37. The method of embodiment 36, wherein the information received from the core network comprises one or more of: subscription information for one or more wireless devices involved in the V2X application; a predefined configuration to be used; information related to a service associated with the V2X application; and one or more network-specific policies.

Embodiment 38. The method of any of embodiments 29-37, wherein the SL resource pool configuration is generated based on a validity of a geographic area associated with the SL resource pool configuration.

Embodiment 39. The method of any of embodiments 29-38, wherein the SL resource pool configuration is generated based on a time validity associated with the SL resource pool configuration.

Embodiment 40. The method of any of embodiments 29-39, wherein the SL resource pool configuration is generated based on one or more of a route of the wireless device and a direction of the wireless device.

Embodiment 41. The method of any of embodiments 29-40, wherein: generating the SL resource pool configuration for the V2X application associated with the wireless device comprises generating a plurality of SL resource pool configurations for the V2X application associated with the wireless device; and sending the generated SL resource pool configuration to the wireless device comprises sending the plurality of SL resource pool configurations for the V2X application associated with the wireless device.

Embodiment 42. The method of embodiment 41, wherein each of the plurality of SL resource pool configurations is associated with one or more of a geographical area validity and a time duration.

Embodiment 43. The method of any of embodiments 29-42, wherein the generated SL resource pool configuration is associated with a geographical area spanning multiple cells.

Embodiment 44. The method of embodiment 43, further comprising sending the generated SL resource pool configuration to one or more network nodes associated with the multiple cells.

Embodiment 45. The method of any of embodiments 29-44, further comprising sending the generated SL resource pool configuration to one or more additional wireless devices involved in the V2X application associated with the wireless device.

Embodiment 46. The method of embodiment 45, further comprising identifying the one or more additional wireless devices involved in the V2X application based on an obtained group ID associating the one or more additional wireless devices with the V2X application.

Embodiment 47. The method of any of embodiments 29-46, further comprising configuring the wireless device to enter an IDLE mode after receiving the generated SL resource pool configuration.

Embodiment 48. The method of any of embodiments 29-46, further comprising configuring the wireless device to remain in a CONNECTED mode after receiving the generated SL resource pool configuration.

Embodiment 49. The method of any of embodiments 29-48, further comprising: determining that the wireless device is engaging in a handover to a target network node; and sending the generated SL resource pool configuration to the target network node.

Embodiment 50. The method of embodiment 49, further comprising receiving an indication that the network node can release SL resources previously allocated to the wireless device.

Embodiment 51. The method of any of embodiments 29-50, further comprising: obtaining user data; and forwarding the user data to a host computer or a wireless device.

Group C Embodiments

Embodiment 52. A wireless device, the wireless device comprising:
processing circuitry configured to perform any of the steps of any of the Group A embodiments; and
power supply circuitry configured to supply power to the wireless device.

Embodiment 53. A network node, the network node comprising:
processing circuitry configured to perform any of the steps of any of the Group B embodiments;
power supply circuitry configured to supply power to the wireless device.

Embodiment 54. A user equipment (UE), the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

Embodiment 55. A communication system including a host computer comprising: processing circuitry configured to provide user data; and
a communication interface configured to forward the user data to a cellular network for transmission to a user equipment (UE),
wherein the cellular network comprises a network node having a radio interface and processing circuitry, the network node's processing circuitry configured to perform any of the steps of any of the Group B embodiments.

Embodiment 56. The communication system of the pervious embodiment further including the network node.

Embodiment 57. The communication system of the previous 2 embodiments, further including the UE, wherein the UE is configured to communicate with the network node.

Embodiment 58. The communication system of the previous 3 embodiments, wherein: the processing circuitry of the host computer is configured to execute a host application, thereby providing the user data; and the UE comprises processing circuitry configured to execute a client application associated with the host application.

Embodiment 59. A method implemented in a communication system including a host computer, a network node and a user equipment (UE), the method comprising: at the host computer, providing user data; and at the host computer, initiating a transmission carrying the user data to the UE via a cellular network comprising the network node, wherein the network node performs any of the steps of any of the Group B embodiments.

Embodiment 60. The method of the previous embodiment, further comprising, at the network node, transmitting the user data.

Embodiment 61. The method of the previous 2 embodiments, wherein the user data is provided at the host computer by executing a host application, the method further comprising, at the UE, executing a client application associated with the host application.

Embodiment 62. A user equipment (UE) configured to communicate with a network node, the UE comprising a radio interface and processing circuitry configured to performs the of the previous 3 embodiments.

Embodiment 63. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

Embodiment 64. The communication system of the previous embodiment, wherein the cellular network further includes a network node configured to communicate with the UE.

Embodiment 65. The communication system of the previous 2 embodiments, wherein: the processing circuitry of the host computer is configured to execute a host application, thereby providing the user data; and the UE's processing circuitry is configured to execute a client application associated with the host application.

Embodiment 66. A method implemented in a communication system including a host computer, a network node and a user equipment (UE), the method comprising: at the host computer, providing user data; and at the host computer, initiating a transmission carrying the user data to the UE via a cellular network comprising the network node, wherein the UE performs any of the steps of any of the Group A embodiments.

Embodiment 67. The method of the previous embodiment, further comprising at the UE, receiving the user data from the network node.

Embodiment 68. A communication system including a host computer comprising: communication interface configured to receive user data originating from a transmission from a user equipment (UE) to a network node, wherein the UE comprises a radio interface and processing circuitry, the UE's processing circuitry configured to perform any of the steps of any of the Group A embodiments.

Embodiment 69. The communication system of the previous embodiment, further including the UE.

Embodiment 70. The communication system of the previous 2 embodiments, further including the network node, wherein the network node comprises a radio interface configured to communicate with the UE and a communication interface configured to forward to the host computer the user data carried by a transmission from the UE to the network node.

Embodiment 71. The communication system of the previous 3 embodiments, wherein: the processing circuitry of the host computer is configured to execute a host application; and the UE's processing circuitry is configured to execute a client application associated with the host application, thereby providing the user data.

Embodiment 72. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 73. A method implemented in a communication system including a host computer, a network node and a user equipment (UE), the method comprising: at the host computer, receiving user data transmitted to the network node from the UE, wherein the UE performs any of the steps of any of the Group A embodiments.

Embodiment 74. The method of the previous embodiment, further comprising, at the UE, providing the user data to the network node.

Embodiment 75. The method of the previous 2 embodiments, further comprising: at the UE, executing a client application, thereby providing the user data to be transmitted; and at the host computer, executing a host application associated with the client application.

Embodiment 76. The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

Embodiment 77. A communication system including a host computer comprising a communication interface configured to receive user data originating from a transmission from a user equipment (UE) to a network node, wherein the network node comprises a radio interface and processing circuitry, the network node's processing circuitry configured to perform any of the steps of any of the Group B embodiments.

Embodiment 78. The communication system of the previous embodiment further including the network node.

Embodiment 79. The communication system of the previous 2 embodiments, further including the UE, wherein the UE is configured to communicate with the network node.

Embodiment 80. The communication system of the previous 3 embodiments, wherein: the processing circuitry of the host computer is configured to execute a host application; the UE is configured to execute a client application associated with the host application, thereby providing the user data to be received by the host computer.

Embodiment 81. A method implemented in a communication system including a host computer, a network node and a user equipment (UE), the method comprising: at the host computer, receiving, from the network node, user data originating from a transmission which the network node has received from the UE, wherein the UE performs any of the steps of any of the Group A embodiments.

Embodiment 82. The method of the previous embodiment, further comprising at the network node, receiving the user data from the UE.

Embodiment 83. The method of the previous 2 embodiments, further comprising at the network node, initiating a transmission of the received user data to the host computer.

Embodiment 84. A computer program, the program comprising instructions which when executed on a computer perform any one of the methods of embodiments 1-28.

Embodiment 85. A computer program product comprising a computer program, the program comprising instructions which when executed on a computer perform any one of the methods of embodiments 1-28.

Embodiment 86. A computer storage medium comprising a computer program, the program comprising instructions which when executed on a computer perform any one of the methods of embodiments 1-28.

Embodiment 87. A computer storage carrier comprising a computer program, the program comprising instructions which when executed on a computer perform any one of the methods of embodiments 1-28.

Embodiment 88. A computer program, the program comprising instructions which when executed on a computer perform any one of the methods of embodiments 29-51.

Embodiment 89. A computer program product comprising a computer program, the program comprising instructions which when executed on a computer perform any one of the methods of embodiments 29-51.

Embodiment 90. A computer storage medium comprising a computer program, the program comprising instructions which when executed on a computer perform any one of the methods of embodiments 29-51.

Embodiment 91. A computer storage carrier comprising a computer program, the program comprising instructions which when executed on a computer perform any one of the methods of embodiments 29-51.

ADDITIONAL INFORMATION

Performance requirements related to several new V2X scenarios have been studied in TR 22.886 Reference source not found. and TS 22.186 Reference source not found. 3GPP system (LTE and NR), including sidelink (SL) interface, is expected to fulfil the required KPIs. Performance requirements for V2X scenarios consider also strict requirements as for instance for the case of platooning, which poses requirements of 10 ms end-to-end latency and 99.99% reliability in the scenario of cooperative driving with highest degree of automation (See, Table 5.2-1 of TS 22.186 V15.3.0). It is also important to note that such requirements should be met for a long period of time, ideally for the whole lifetime of the platoon. Therefore, it is important that for some critical V2X services, such as platooning, cooperative manoeuvre, data/sensor sharing, etc, the resource allocation framework aims at maintaining a certain level of QoS performances across a relatively large area and several cells.

Aspects related to the feasibility of extending LTE SL resource allocation for NR SL and potential enhancements to enhance sidelink mobility performances are discussed herein. The legacy SIB/RRC resource pool acquisition should be considered as baseline also for NR SL V2X. When SIB/RRC is provided by the eNB and the UE is in-coverage on the V2X frequency, the preconfigured resources are simply overridden by explicit network configuration, as it already happens in LTE.

Proposal 1: The RAN can provide, as in LTE, a resource pool configuration to the UE via SIB or RRC signalling to be used when in coverage, instead of the preconfigured resources. However, an important aspect to consider regarding V2X scenarios is related to the mobility of UEs. In this case, guaranteeing as stable performance as possible represents an important feature to be fulfilled for the stability of certain V2X applications. For instance, considering platooning, it is important that performances are stable while the platoon moves, as drastic changes of performance might involve instabilities such as too quick adaptation of inter-truck distances with possible safety impacts, and increased fuel consumption. Having a stable resource allocation within a certain geographical area and across several cells, is certainly beneficial to achieve stable performances which will be less affected by mobility procedures, such as handover or cell (re)selection.

Observation 1: Experiencing performance as stable as possible in large areas is beneficial for certain V2X scenarios, e.g. platooning. For example, the UE or a group of UEs may be configured by the gNB via SIB/RRC signalling with a certain resource configuration, e.g. mode-2, when entering a certain geographical area. The network may also indicate for how long such resources can be used or the area (possibly covering more than one cell) in which such resources can be kept. The network implementation can for example configure a dedicated pool for certain UEs, and dimension it such that it fits as much as possible the QoS requirement of those UEs. If this configuration can be kept unchanged across a relatively large area, the UE performances can be kept stable, while the UEs are moving in such area. By doing so, also from latency perspective, the performances might be enhanced, due to the fact that the UE would not need to acquire new configuration via SIB/RRC signalling, whenever handover/cell(re)selection is performed. Additionally, it would be beneficial also from a network perspective, in order to reduce the signalling information to be transmitted, since only few cells in certain areas can be configured by the operator to provide the resource configuration.

Observation 2: To achieve stable performances, reduced latency, and reduced network signalling overhead, it is beneficial to aim at keeping resource configuration unchanged for a given UE (or group of UEs), while they are moving within a certain geographical area.

Proposal 2: A resource configuration, i.e. mode-1 or mode-2, for a given V2X service can be provided by the network, e.g. via RRC/SIB signalling, when the UE (or group of UEs) enters a certain geographical area.

Proposal 3: The resource configuration provided by the network for a given geographical area can be used by the UE (or group of UEs) for SL V2X communications, while the UE is traversing such geographical area, which can cover more than one cell. Proposal 4: The UE (or group of UEs) does not need to acquire a new pool configuration at every handover/cell (re)selection, once a pool configuration valid for this geographical area has been already acquired.

In conclusion, the following observations are made:

Observation 1: Experiencing performance as stable as possible in large areas is beneficial for certain V2X scenarios, e.g. platooning.

Observation 2: To achieve stable performances, reduced latency, and reduced network signalling overhead, it is beneficial to aim at keeping resource configuration unchanged for a given UE or group of UEs, while they are moving within a certain geographical area.

Based on the discussion above, the following is proposed:

Proposal 1: The RAN can provide, as in LTE, a resource pool configuration to the UE via SIB or RRC signalling to be used when in coverage, instead of the preconfigured resources.

Proposal 2: A resource configuration, i.e. mode-1 or mode-2, for a given V2X service can be provided by the network, e.g. via RRC/SIB signalling, when the UE (or group of UEs) enters a certain geographical area.

Proposal 3: The resource configuration provided by the network for a given geographical area can be used by the UE (or group of UEs) for SL V2X communications, while the UE is traversing such geographical area, which can cover more than one cell.

Proposal 4: The UE (or group of UEs) does not need to acquire a new pool configuration at every handover/cell (re)selection, once a pool configuration valid for this geographical area has been already acquired.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3 GPP 3rd Generation Partnership Project
5G 5th Generation
ABS Almost Blank Subframe
AID Application Identifier
AMF Access Mobility Function
ARQ Automatic Repeat Request
AWGN Additive White Gaussian Noise
BCCH Broadcast Control Channel
BCH Broadcast Channel
BSS Business Support System
CA Carrier Aggregation
CAM Cooperative Awareness Message
CC Carrier Component
CCCH SDU Common Control Channel SDU
CDMA Code Division Multiplexing Access
CGI Cell Global Identifier
CIR Channel Impulse Response
CN Core Network
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
D2D Device to Device
DCCH Dedicated Control Channel
DENM Decentralized Environmental Notification Message
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
ETSI European Telecommunications Standards Institute
E-UTRA Evolved UTRA
E-UTRAN Evolved UTRAN
FDD Frequency Division Duplex
FFS For Further Study
GERAN GSM EDGE Radio Access Network
GFBR Guaranteed Flow Bit Rate
gNB Base station in NR
GNSS Global Navigation Satellite System GSM Global System for Mobile communication
HARQ Hybrid Automatic Repeat Request
HO Handover
HSPA High Speed Packet Access
HRPD High Rate Packet Data
ITS Intelligent Transportation Systems
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MCPTT Mission-Critical Push-to-Talk
MCS Modulation Coding Scheme
MDT Minimization of Drive Tests
MIB Master Information Block
MME Mobility Management Entity
MSC Mobile Switching Center
NPDCCH Narrowband Physical Downlink Control Channel
NR New Radio
NW Network
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCF Policy Control Function
PCFICH Physical Control Format Indicator Channel
PDB Packet Delay Budget
PDCCH Physical Downlink Control Channel
PDP Profile Delay Profile
PDSCH Physical Downlink Shared Channel
PER Packet Error Rate
PGW Packet Gateway
PHICH Physical Hybrid-ARQ Indicator Channel
PLMN Public Land Mobile Network
PMI Precoder Matrix Indicator
PRACH Physical Random Access Channel
ProSe Proximity Services
PRS Positioning Reference Signal
PSID Private System ID
PSS Primary Synchronization Signal
PUCCH Physical Uplink Control Channel
PUSCH Physical Uplink Shared Channel
QAM Quadrature Amplitude Modulation
QoS Quality of Service
RACH Random Access Channel
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
RSU Roadside Unit
SCH Synchronization Channel
SCell Secondary Cell
SDU Service Data Unit
SFN System Frame Number
SGW Serving Gateway
SI System Information
SIB System Information Block
SI-RNTI System Information Radio Network Temporary Identifier
SL Sidelink
SMF Session Management Function
SNR Signal to Noise Ratio
SON Self Optimized Network
SPS Semi-Persistent Scheduling
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
V2I Vehicle to Infrastructure
V2N Vehicle to Network
V2P Vehicle to Pedestrian
V2V Vehicle to Vehicle
V2X Vehicle-to-everything
WCDMA Wide CDMA
WLAN Wide Local Area Network

The invention claimed is:

1. A method performed by a wireless device, the method comprising:
in response to a triggering event, sending, to a network node, a request for a sidelink (SL) resource pool configuration for a V2X application associated with the wireless device, wherein the request includes one or more SL resource pool configurations, wherein the wireless device is one of a plurality of wireless devices involved in the V2X application, and wherein the wireless device is configured to send the request for the one or more SL resource pool configurations on behalf of the plurality of wireless devices involved in the V2X application; and
receiving, in response to the request, a SL resource pool configuration from the network node, and
wherein the triggering event comprises at least one of:
determining that the wireless device is configured with a previous SL resource pool configuration that no longer guarantees one or more quality of service requirements for the V2X application, and
determining that the wireless device has transitioned from an out-of-coverage scenario to an in-coverage scenario and a previous SL resource pool configuration configured for the out-of-coverage scenario is no longer valid.

2. A method performed by a network node, the method comprising:
- receiving, from a wireless device, a request for a sidelink (SL) resource pool configuration for a V2X application associated with the wireless device, wherein the request includes one or more SL resource pool configurations, wherein the wireless device is one of a plurality of wireless devices involved in the V2X application, and wherein the wireless device is configured to send the request for the SL resource pool configuration on behalf of the plurality of wireless devices involved in the V2X application in response to a triggering event, wherein the triggering event comprises at least one of:
  - the wireless device is configured with a previous SL resource pool configuration that no longer guarantees one or more quality of service requirements for the V2X application, and
  - the wireless device has transitioned from an out-of-coverage scenario to an in-coverage scenario and a previous SL resource pool configuration configured for the out-of-coverage scenario is no longer valid,
- generating a SL resource pool configuration for the V2X application associated with the wireless device; and
- sending the generated SL resource pool configuration to the plurality of wireless devices involved in the V2X application.

3. A wireless device comprising:
processing circuitry configured to:
- in response to a triggering event, send, to a network node, a request for a sidelink (SL) resource pool configuration for a V2X application associated with the wireless device, wherein the request includes one or more SL resource pool configurations, wherein the wireless device is one of a plurality of wireless devices involved in the V2X application, and wherein the wireless device is configured to send the request for the SL resource pool configuration on behalf of the plurality of wireless devices involved in the V2X applications; and
- receive, in response to the request, a SL resource pool configuration from the network node, and
- wherein the triggering event comprises at least one of:
  - determining that the wireless device is configured with a previous SL resource pool configuration that no longer guarantees one or more quality of service requirements for the V2X application, and
  - determining that the wireless device has transitioned from an out-of-coverage scenario to an in-coverage scenario and a previous SL resource pool configuration configured for the out-of-coverage scenario is no longer valid.

4. The wireless device of claim 3, wherein the SL resource pool configuration comprises information needed to transmit and/or receive data over the SL.

5. The wireless device of claim 4, wherein the information comprises one or more of:
- time and frequency resources;
- a set of transmitting parameters; and
- a synchronization source.

6. The wireless device of claim 3, wherein the requests comprises one or more geographical area identifiers associated with one or more respective SL resource pool configurations, and wherein the one or more geographical area identifiers are associated with one or more of:
- geographical area in which the wireless device is located; and
- a geographical area for which the wireless device would like to receive a SL resource pool configuration.

7. The wireless device of claim 6, wherein the processing circuitry is configured to determine the one or more geographical area identifiers based on system information broadcast by the network node.

8. The wireless device of claim 3, wherein the request is sent upon entering connection establishment with the network node.

9. The wireless device of claim 3, wherein the request is sent as part of a random-access procedure.

10. A network node comprising:
processing circuitry configured to:
- receive, from a wireless device, a request for a sidelink (SL) resource pool configuration for a V2X application associated with the wireless device, the request including one or more SL resource pool configurations, wherein the wireless device is one of a plurality of wireless devices involved in the V2X application, and wherein the wireless device is configured to send the request for the SL resource pool configuration on behalf of the plurality of wireless devices involved in the V2X application in response to a triggering event, wherein the triggering event comprises at least one of:
  - determining that the wireless device is configured with a previous SL resource pool configuration that no longer guarantees one or more quality of service requirements for the V2X application, and
  - determining that the wireless device has transitioned from an out-of-coverage scenario to an in-coverage scenario and a previous SL resource pool configuration configured for the out-of-coverage scenario is no longer valid,
- generate a SL resource pool configuration for the V2X application associated with the wireless device; and
- send the generated SL resource pool configuration to the plurality of wireless devices involved in the V2X application.

11. The network node of claim 10, wherein the one or more SL resource pool configurations comprise information needed to transmit and/or receive data over the SL.

12. The network node of claim 11, wherein the information comprises one or more of:
- time and frequency resources;
- a set of transmitting parameters; and
- a synchronization source.

13. The network node of claim 10, wherein the request comprises one or more geographical area identifiers that are associated with one or more of:
- a geographical area in which the wireless device is located; and
- a geographical area for which the wireless device would like to receive a SL resource pool configuration.

14. The network node of claim 10, wherein the request for the SL resource pool configuration comprises one or more of:
- an expected or planned route of the wireless device;
- an indication of a direction in which the wireless device is moving;
- a speed of the wireless device;
- a System Information Radio Network Temporary Identifier (SI-RNTI) of a system information block (SIB) containing a SL resource pool configuration the wireless device would like to receive;
- an identifier of the V2X application;
- a type of communication the wireless device is currently involved in;
- a time duration of the V2X application;
- capability information for the wireless device;

an indication as to whether the wireless device desires a SL resource pool configuration in which resources are autonomously selected by the wireless device or in which resources are scheduled by the network node;

a number of wireless devices involved in the V2X application; and an indication as to whether the wireless device needs to release previously configured resources.

15. The network node of claim 10, wherein the one or more SL resource pool configurations are generated based on one or more criteria.

16. The network node of claim 15, wherein the one or more criteria comprise one or more of:

a current and/or expected cell load;

a current and/or expected congestion level;

a current and/or expected interference level;

a type of the V2X application;

a quality of service (QOS) requirement for the V2X application;

a type of communication used;

resource availability in one or more cells associated with a same geographical area ID.

17. The network node of claim 10, wherein the one or more SL resource pool configurations are generated based on information received from a core network.

18. The network node of claim 17, wherein the information received from the core network comprises one or more of:

subscription information for one or more wireless devices involved in the V2X application;

a pre-defined configuration to be used;

information related to a service associated with the V2X application; and one or more network-specific policies.

* * * * *